US012091641B2

(12) United States Patent
Ryther et al.

(10) Patent No.: US 12,091,641 B2
(45) Date of Patent: Sep. 17, 2024

(54) HIGH FLASHPOINT ALCOHOL BASED CLEANING, SANITIZING AND DISINFECTING COMPOSITION AND METHOD OF USE ON FOOD CONTACT SURFACES

(71) Applicant: Ecolab USA Inc., St. Paul, MN (US)

(72) Inventors: Robert J. Ryther, St. Paul, MN (US); Nicole M. Delaney, St. Paul, MN (US); Jesse D. Hines, Eagan, MN (US); Linda E. Grieme, Minneapolis, MN (US)

(73) Assignee: ECOLAB USA INC., Saint Paul, MN (US)

( * ) Notice: Subject to any disclaimer, the term of this patent is extended or adjusted under 35 U.S.C. 154(b) by 276 days.

(21) Appl. No.: 17/076,097

(22) Filed: Oct. 21, 2020

(65) Prior Publication Data

US 2021/0087497 A1 Mar. 25, 2021

Related U.S. Application Data

(63) Continuation of application No. 13/568,724, filed on Aug. 7, 2012, now Pat. No. 10,844,322.

(51) Int. Cl.
*C11D 3/20* (2006.01)
*C11D 3/39* (2006.01)
(Continued)

(52) U.S. Cl.
CPC .......... *C11D 3/2017* (2013.01); *C11D 3/2003* (2013.01); *C11D 3/3947* (2013.01); *C11D 3/48* (2013.01); *C11D 1/62* (2013.01)

(58) Field of Classification Search
CPC ....... C11D 3/2017; C11D 3/3947; C11D 3/48; C11D 1/62
See application file for complete search history.

(56) References Cited

U.S. PATENT DOCUMENTS 3,929,678 A * 12/1975 Laughlin ................ C11D 1/886 510/349
5,269,974 A 12/1993 Ofosu-Asante
(Continued)

FOREIGN PATENT DOCUMENTS

EP 2 338 343 A1 6/2011
GB 1 383 519 2/1975
(Continued)

OTHER PUBLICATIONS

N.A. Falk. J. Surfac. Deterg. (Year: 2019).*
(Continued)

*Primary Examiner* — Nicole M. Buie-Hatcher
*Assistant Examiner* — M. Reza Asdjodi
(74) *Attorney, Agent, or Firm* — Merchant & Gould P.C.

(57) ABSTRACT

The invention is directed to a high flashpoint alcohol based cleaning, sanitizing and disinfecting composition and its method of use on food contact surfaces. More particularly, the present invention relates to a quick drying and ready to use cleaning and sanitizing formula with an isopropyl alcohol level low enough to permit a reduced flammability rating while maintaining microbiological sanitizing and disinfecting properties.

56 Claims, 15 Drawing Sheets

(51) Int. Cl.
*C11D 3/48* (2006.01)
*C11D 1/62* (2006.01)

(56) References Cited

U.S. PATENT DOCUMENTS

| | | | | |
|---|---|---|---|---|
| 5,417,893 | A | 5/1995 | Ofosu-Asante | |
| H1467 | H | 8/1995 | Prieto et al. | |
| 5,573,710 | A | 11/1996 | McDonell | |
| 5,767,054 | A | 6/1998 | Sprugel et al. | |
| 5,786,317 | A | 7/1998 | Townsend | |
| 5,861,365 | A | 1/1999 | Colurciello, Jr. et al. | |
| 5,977,054 | A * | 11/1999 | Wierenga | C11D 3/042 510/191 |
| 6,013,615 | A * | 1/2000 | Zhou | C11D 1/835 510/434 |
| 6,090,771 | A * | 7/2000 | Burt | C11D 11/0058 510/411 |
| 6,106,774 | A * | 8/2000 | Monticello | C11D 3/2068 422/1 |
| 6,159,916 | A | 12/2000 | Robbins et al. | |
| 6,162,778 | A | 12/2000 | McKillop et al. | |
| 6,245,361 | B1 | 6/2001 | Merritt | |
| 6,255,270 | B1 * | 7/2001 | Barger | C11D 3/042 510/214 |
| 6,281,178 | B1 * | 8/2001 | Ryklin | C11D 1/24 510/179 |
| 6,284,723 | B1 * | 9/2001 | Zhou | C11D 1/835 510/384 |
| 6,302,968 | B1 | 10/2001 | Baum et al. | |
| 6,455,486 | B1 * | 9/2002 | Kerobo | C11D 1/72 510/238 |
| 6,627,207 | B1 | 9/2003 | Petersen | |
| 6,642,197 | B1 * | 11/2003 | Cheung | A01N 33/12 510/101 |
| 6,979,667 | B1 | 12/2005 | Kaiser et al. | |
| 7,144,846 | B2 | 12/2006 | Keller et al. | |
| 7,439,218 | B2 | 10/2008 | Bowker | |
| 7,510,859 | B2 * | 3/2009 | Wieland | C11D 3/38636 424/401 |
| 7,544,649 | B2 | 6/2009 | Aihara et al. | |
| 8,071,520 | B2 | 12/2011 | Hodge et al. | |
| 8,344,026 | B2 | 1/2013 | Li et al. | |
| 8,524,775 | B2 | 9/2013 | Li et al. | |
| 8,673,365 | B2 * | 3/2014 | Wang | A01N 37/36 422/1 |
| 8,883,848 | B2 | 11/2014 | Bolduc et al. | |
| 10,844,322 | B2 | 11/2020 | Ryther et al. | |
| 2002/0058600 | A1 * | 5/2002 | Van Eenam | C11D 3/3418 510/408 |
| 2002/0064565 | A1 | 5/2002 | Karagoezian | |
| 2002/0086039 | A1 * | 7/2002 | Lee | C03C 3/097 424/401 |
| 2002/0193268 | A1 | 12/2002 | Embleton et al. | |
| 2003/0162685 | A1 | 8/2003 | Man et al. | |
| 2005/0003990 | A1 * | 1/2005 | Smith | C11D 17/041 510/421 |
| 2006/0035807 | A1 | 2/2006 | Kasturi et al. | |
| 2006/0100119 | A1 * | 5/2006 | Smith | C23G 1/125 510/235 |
| 2006/0100122 | A1 * | 5/2006 | Baars | C11D 3/2086 510/424 |
| 2006/0269441 | A1 * | 11/2006 | Ochomogo | C11D 3/124 422/28 |
| 2006/0293201 | A1 | 12/2006 | Simon et al. | |
| 2007/0065475 | A1 | 3/2007 | Elfersy | |
| 2007/0166398 | A1 * | 7/2007 | Bobbert | A61L 2/186 510/302 |
| 2007/0179079 | A1 * | 8/2007 | Kilkenny | C11D 3/3776 510/499 |
| 2007/0190172 | A1 * | 8/2007 | Bobbert | A61L 2/186 514/129 |
| 2008/0145390 | A1 | 6/2008 | Taylor et al. | |
| 2008/0202556 | A1 | 8/2008 | Pivonka et al. | |
| 2008/0305071 | A1 | 12/2008 | Lloyd et al. | |
| 2009/0312225 | A1 | 12/2009 | Szewczyk et al. | |
| 2009/0324508 | A1 | 12/2009 | Bobbert | |
| 2010/0021557 | A1 * | 1/2010 | Li | A23B 5/14 562/2 |
| 2010/0048730 | A1 | 2/2010 | Li et al. | |
| 2010/0055198 | A1 * | 3/2010 | Wang | C11D 3/3947 424/616 |
| 2010/0068295 | A1 * | 3/2010 | Bobbert | A01N 59/00 424/616 |
| 2010/0330196 | A1 * | 12/2010 | Ramirez | A01N 25/30 424/616 |
| 2011/0112009 | A1 * | 5/2011 | Hodge | C11D 1/345 510/436 |
| 2011/0259367 | A1 | 10/2011 | Ahmed et al. | |
| 2012/0071386 | A1 * | 3/2012 | Hodge | C11D 3/33 510/420 |
| 2012/0177746 | A1 * | 7/2012 | Ramirez | C11D 3/3454 424/616 |
| 2013/0210695 | A1 * | 8/2013 | Bjelopavlic | C11D 3/042 510/470 |
| 2013/0259743 | A1 | 10/2013 | Keasler et al. | |
| 2013/0264059 | A1 | 10/2013 | Keasler et al. | |
| 2013/0264293 | A1 | 10/2013 | Keasler et al. | |
| 2014/0041686 | A1 * | 2/2014 | Ryther | C11D 3/2003 510/218 |
| 2021/0087497 | A1 * | 3/2021 | Ryther | C11D 3/3947 |

FOREIGN PATENT DOCUMENTS

| | | | | |
|---|---|---|---|---|
| GB | 2319179 | A * | 5/1998 | A01N 59/00 |
| RU | 2308292 | C2 | 10/2007 | |
| WO | WO-9412609 | A1 * | 6/1994 | C11D 10/04 |
| WO | 02/39982 | A1 | 5/2002 | |
| WO | 03/067989 | A1 | 8/2003 | |
| WO | 2006/052369 | A1 | 5/2006 | |
| WO | 2006/127172 | A2 | 11/2006 | |
| WO | WO-2007080187 | A1 * | 7/2007 | A01N 57/12 |
| WO | 2007/125101 | A1 | 11/2007 | |

OTHER PUBLICATIONS

Davis, et al., "Household Cleaners: Environmental Evaluation and Proposed Standards For General Purpose Household Cleaners", Green Seal Inc., University of Tennessee Center for Clean Products and Clean Technologies, Jul. 1992, 1-115.

Du, et al., "Efficacy of Aqueous and Alcohol-Based Quaternary Ammonium Sanitizers for Reducing *Salmonella* in Dusts Generated in Almond Hulling and Shelling Facilities", JFS M: Food Microbiology and Safety, 2010, M7-M13.

Gronholm, et al., "Screening of antimicrobial activities of Disinfectants and cleanings agents against foodborne spoilage microbes", Z Lebensm Unters Forsch A (1999) 208:289-298, Jun. 30, 1998.

Website, "BioSpray D2 Specifications—1 Priority Biocidal. A Better Solution", http://www.go1bio.com/biospray-d2/biospray-d2-specifications/ printed on Nov. 17, 2014, Nov. 17, 2014, 1 page.

* cited by examiner

Figure 1

| | Water | Phosphoric acid, 75% | Propionic acid, 97% | Lactic acid, 88% | Acetic Acid, 80% | Monosodium phosphate Anhyd. Gran. | Isopropyl alcohol, 99% | Sodium Linear Alkyl Benzene Sulfonate 85% | Sodium Lauryl Sulfonate 30% | Decanoic Acid, 99% | Octanoic Acid, 98% | n-Pelargonic Acid, 94% | 1-Hydroxyethane-1,1-diphosphonic Acid, 60% | **Total** |
|---|---|---|---|---|---|---|---|---|---|---|---|---|---|---|
| **Formula 1** | 82.88 | | | 5.00 | | | 12.00 | | 0.12 | | | | | 100.00 |
| **Formula 2** | 82.83 | 5.00 | | | | 0.04 | 12.00 | | 0.12 | | | | 0.01 | 100.00 |
| **Formula 3** | 87.79 | | | | 0.09 | | 12.00 | | 0.12 | | | | | 100.00 |
| **Formula 4** | 87.88 | | | | | | 12.00 | 0.09 | | 0.01 | 0.02 | | | 100.00 |
| **Formula 5** | 94.82 | 5.00 | | 0.02 | | 0.04 | | 0.09 | | 0.01 | 0.02 | | | 100.00 |
| **Formula 6** | 94.79 | 5.03 | 0.03 | | | 0.04 | | 0.09 | | 0.01 | | 0.01 | | 100.00 |
| **Formula 7** | 87.86 | | | 0.02 | | | 12.00 | | 0.12 | | | | | 100.00 |

Figure 2

| | Water | Phosphoric acid, 75% | Propionic acid, 97% | Lactic acid, 88% | Acetic Acid, 80% | Monosodium phosphate Anhyd. Gran. | Isopropyl alcohol, 99% | Sodium Linear Alkyl Benzene Sulfonate 85% | Sodium Lauryl Sulfonate 30% | Alkyl Polyglucoside, 70% | Decanoic Acid, 99% | Octanoic Acid, 98% | n-Pelargonic Acid, 94% | 1-Hydroxyethane-1,1-diphosphonic Acid, 60% | **Total** |
|---|---|---|---|---|---|---|---|---|---|---|---|---|---|---|---|
| **Formula 8** | 87.69 | | | | 0.09 | | 12.00 | | 0.12 | 0.10 | | | | | 100.000 |
| **Formula 9a** | 87.33 | 0.50 | | | | 0.04 | 12.00 | | 0.12 | | | | | 0.01 | 100.000 |
| **Formula 9b** | 87.33 | 0.50 | | | | 0.04 | 12.00 | | 0.12 | | | | | 0.01 | 100.000 |
| **Formula 10** | 86.83 | 1.00 | | | | 0.04 | 12.00 | | 0.12 | | | | | 0.01 | 100.000 |
| **Formula 11** | 87.72 | 0.09 | 0.03 | | | | 12.00 | | 0.12 | | 0.01 | 0.02 | 0.01 | | 100.000 |
| **Formula 12** | 87.62 | | 0.03 | | 0.09 | | 12.00 | | 0.12 | 0.10 | 0.01 | 0.02 | 0.01 | | 100.000 |
| **Formula 13** | 87.82 | | | 0.02 | | 0.04 | 12.00 | 0.09 | | | 0.01 | 0.02 | | | 100.000 |

Figure 3

| | Water | Potassium carbonate | Phosphoric acid, 75% | Propionic acid, 97% | Monosodium phosphate Anhyd. Gran. | Isopropyl alcohol, 99% | Sodium Linear Alkyl Benzene Sulfonate 85% | Sodium Lauryl Sulfonate 30% | Alkyl Polyglucoside, 70% | Linear Alkyl Benzene Sulfonic Acid | Bardac 205M | Octyl Decyl Dimethyl Ammonium Chloride, 80% | Dioctyl Dimethyl Ammonium Chloride, 70% | Didecyl Dimethyl Ammonium Chloride, 99% | Decanoic Acid, 99% | Octanoic Acid, 98% | n-Pelargonic Acid, 94% | Hydrogen peroxide, 35% | 1-Hydroxyethane-1,1-diphosphonic Acid, 60% | Ethylene diamine tetraacetic acid, 40% | Silver citrate | Total |
|---|---|---|---|---|---|---|---|---|---|---|---|---|---|---|---|---|---|---|---|---|---|---|
| Formula 14 | 87.82 | | | 0.03 | 0.04 | 12.00 | 0.09 | | | | | | | | 0.01 | | 0.01 | | | | | 100.00 |
| Formula 15 | 87.62 | | 0.09 | 0.03 | | 12.00 | | 0.12 | 0.10 | | | | | | 0.01 | 0.02 | 0.01 | | | | | 100.00 |
| Formula 16 | 41.39 | | | | | 58.60 | | | | | | 0.01 | 0.00 | 0.00 | | | | | | | | 100.00 |
| Formula 17 | 87.37 | 0.30 | | | | 12.00 | | | 0.10 | | 0.08 | | | | | | | 0.13 | | 0.01 | 0.01 | 100.00 |
| Formula 18 | 87.38 | 0.30 | | | | 12.00 | | | 0.10 | | 0.08 | | | | | | | 0.13 | | 0.01 | | 100.00 |
| Formula 19a | 87.49 | | | | | 12.00 | | | | 0.50 | | | | | | | | | 0.01 | | | 100.00 |
| Formula 19b | 87.49 | | | | | 12.00 | | | | 0.50 | | | | | | | | | 0.01 | | | 100.00 |

Figure 4

| | Water Zeolite Softened | Potassium carbonate | Isopropyl alcohol, 99% | Sodium Lauryl Sulfonate 30% | Alkyl Polyglucoside, 70% | Linear Alkyl Benzene Sulfonic Acid | Bardac 205M | Hydrogen peroxide, 35% | 1-Hydroxyethane-1,1-diphosphonic Acid, 60% | Ethylene diamine tetracetic acid, 40% | Pyridine-2,6-dicarboxylic acid, 99% | **Total** |
|---|---|---|---|---|---|---|---|---|---|---|---|---|
| **Formula 20** | 87.38 | 0.300 | 12.00 | | 0.10 | | 0.08 | 0.13 | | 0.01 | | 100.00 |
| **Formula 21** | 87.68 | 0.001 | 12.00 | | 0.10 | | 0.08 | 0.13 | | 0.01 | | 100.00 |
| **Formula 22** | 87.33 | | 0.50 | 0.04 | 12.00 | 0.12 | | | | 0.01 | | 100.00 |
| **Formula 23** | 87.56 | 0.001 | 12.00 | 0.12 | 0.10 | 0.08 | | 0.13 | | 0.01 | | 100.00 |
| **Formula 24** | 87.69 | 0.001 | 12.00 | 0.12 | 0.10 | 0.08 | | | | 0.01 | | 100.00 |
| **Formula 25** | 87.81 | 0.001 | 12.00 | | 0.10 | | 0.08 | | | 0.01 | | 100.00 |
| **Formula 26** | 87.67 | 0.001 | 12.00 | | 0.10 | | 0.08 | 0.13 | | 0.01 | 0.01 | 100.00 |

Figure 5

| | Water Zeolite Softened | Potassium carbonate | Isopropyl alcohol, 99% | Lutensol TDA 9 (BASF) | Genapol EP 2454 (Clariant) | Tomadol 25-3 (Air Products) | Alkyl Polyglucoside, 70% | Bardac 205M | Hydrogen peroxide, 35% | Ethylene diamine tetraacetic acid, 40% | Pyridine-2,6-dicarboxylic acid, 99% | **Total** |
|---|---|---|---|---|---|---|---|---|---|---|---|---|
| **Formula 27** | 87.80 | 0.001 | 12.00 | | | | 0.10 | 0.08 | | 0.01 | 0.01 | 100.00 |
| **Formula 28** | 88.67 | 0.001 | 11.00 | | | | 0.10 | 0.08 | 0.13 | 0.01 | 0.01 | 100.00 |
| **Formula 29** | 88.69 | 0.001 | 11.00 | 0.075 | | | | 0.08 | 0.13 | 0.01 | 0.01 | 100.00 |
| **Formula 30** | 88.74 | 0.001 | 11.00 | 0.025 | | | | 0.08 | 0.13 | 0.01 | 0.01 | 100.00 |
| **Formula 31** | 88.69 | 0.001 | 11.00 | | 0.075 | | | 0.08 | 0.13 | 0.01 | 0.01 | 100.00 |
| **Formula 32** | 88.69 | 0.001 | 11.00 | | | 0.075 | | 0.08 | 0.13 | 0.01 | 0.01 | 100.00 |

HIGH FLASHPOINT ALCOHOL BASED CLEANING, SANITIZING AND DISINFECTING COMPOSITION AND METHOD OF USE ON FOOD CONTACT SURFACES

CROSS-CITE TO RELATED APPLICATIONS

This application is a continuation of U.S. application Ser. No. 13/568,724, filed Aug. 7, 2012, the disclosure of which is incorporated in its entirety.

FIELD OF THE INVENTION

The invention is directed to a high flashpoint alcohol based cleaning, sanitizing and disinfecting composition and its method of use on food contact surfaces. More particularly, the present invention relates to a quick drying and ready to use cleaning and sanitizing formula with an isopropyl alcohol level low enough to permit a reduced flammability rating while maintaining microbiological sanitizing and disinfecting properties.

BACKGROUND

Alcohol based cleaning, sanitizing and disinfecting compositions are known in the art. Especially useful are cleaning, sanitizing and disinfecting compositions, which typically are used to clean a food contact surface and to destroy bacteria and other microorganisms present on the surface.

Alcohol based cleaning, sanitizing and disinfecting compositions are used, for example, in the food service industry; meat processing industry; and in the private sector by individual consumers. The widespread use of alcohol based cleaning, sanitizing and disinfecting compositions indicate the importance consumers place on controlling bacteria and other microorganism populations on food contact surfaces. It is important, however, that the alcohol based cleaning, sanitizing and disinfecting compositions provide a substantial and broad spectrum reduction in microorganism populations quickly and without problems associated with flammability.

The present invention focuses on an alcohol based cleaning, sanitizing and disinfecting composition which maintains similar sanitizing and disinfecting properties as a high isopropyl alcohol containing formula but with approximately five times lower level of isopropyl alcohol content while maintaining the same level of food contact surface sanitizing properties.

A number of alcohol based sanitizing technologies at levels acceptable for food contact surface sanitizing formulas are well known in the art. However, the current alcohol based sanitizing technologies have a risk of flammability at relatively low temperatures. The present invention solves this problem by matching the microbial kill properties of the current alcohol based formulas but containing only about 12% alcohol to insure a closed cup flashpoint of greater than 100 degrees Fahrenheit. The current invention achieves microbial kill required for sanitizing and disinfecting properties with a lower alcohol level while still maintaining acceptable levels of components for an EPA food contact surface sanitizer. Moreover, the current invention also provides good cleaning properties in addition to good microbial kill properties.

The cleaning, sanitizing and disinfecting compositions are addressed by embodiments of the present invention and will be understood by reading and studying the following specification. The following summary is made by way of example and not by way of limitation. It is merely provided to aid the reader in understanding some of the aspects of the invention.

Other objects, aspects and advantages of this invention will be apparent to one skilled in the art in view of the following disclosure, the drawings, and the appended claims.

BRIEF DESCRIPTION OF THE DRAWINGS

FIG. 1 is a table illustrating the compositions of formulas 1-7 used in the examples listed below.

FIG. 2 is a table illustrating the compositions of formulas 8-13 used in the examples listed below.

FIG. 3 is a table illustrating the compositions of formulas 14-19 used in the examples listed below.

FIG. 4 is a table illustrating the compositions of formulas 20-26 used in the examples listed below.

FIG. 5 is a table illustrating the compositions of formulas 27-32 used in the examples listed below.

SUMMARY OF THE INVENTION

Figure 6:
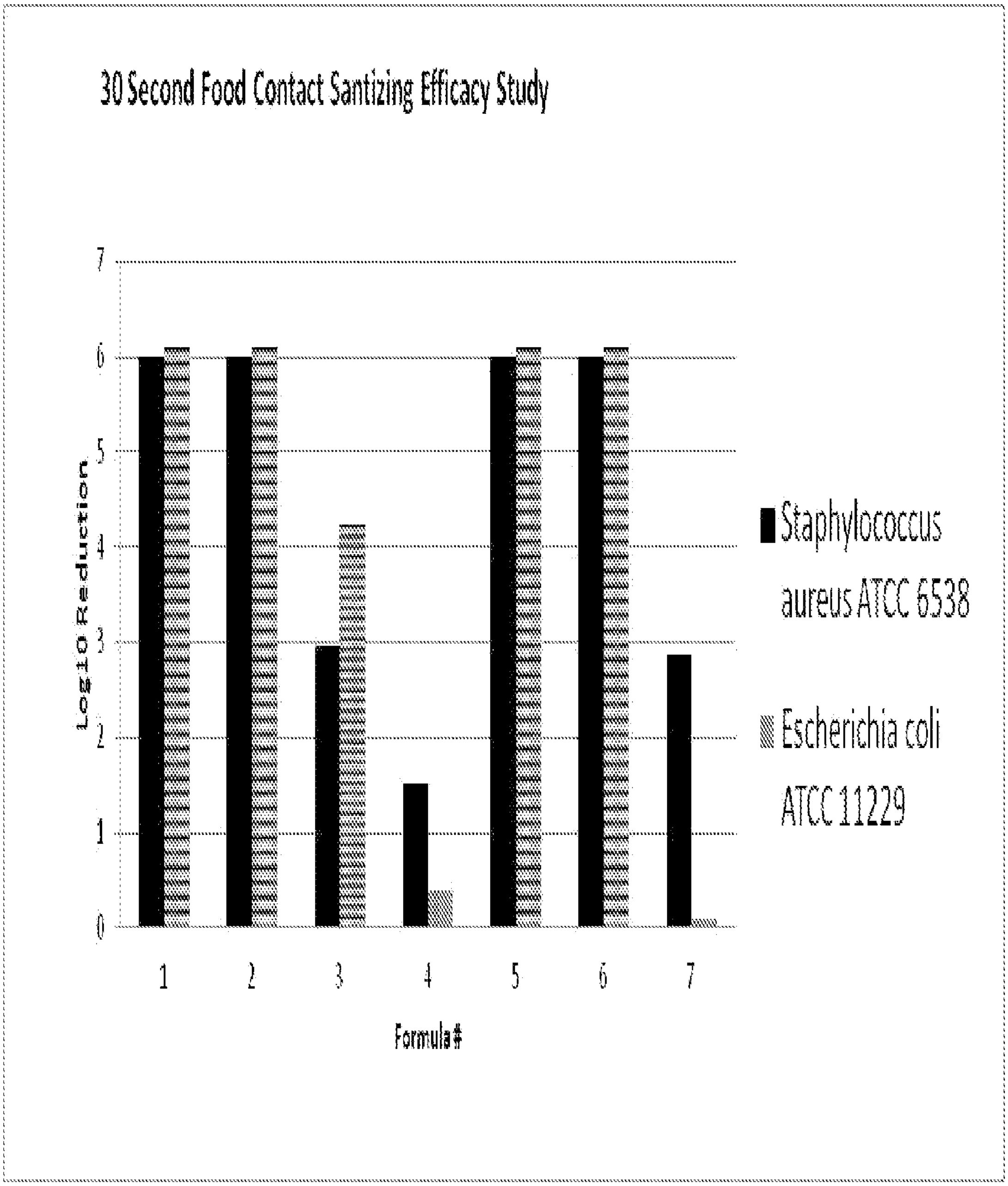
FIG. 6 is a graph depicting the results of a 30 second food contact sanitizing test measuring microbial kill efficacy for ready to use solutions against bacterial strains of *S. aureus* and *E. coli* in solution.

The summary of the invention is intended to introduce the reader to various exemplary aspects of the invention. Particular aspects of the invention are shown in other sections herein below, and the invention is set forth in the appended claims which alone demarcate its scope.

In accordance with an exemplary embodiment of the present invention, a ready to use, aqueous cleaning and sanitizing composition for removing oily soils on a food contact surface is provided. The cleaning and sanitizing composition comprises an alcohol at a low level to permit reduced flammability, one or more surfactants, a quaternary ammonium alkyl or aryl salt and one or more peroxide sources.

Accordingly, one aspect of the present invention is to provide a ready to use, aqueous cleaning and sanitizing composition for removing oily soils on a food contact surface comprising: (a) an alcohol at a low level to permit reduced flammability, wherein the alcohol functions as a wetting agent, a cleaning solvent and an active disinfecting/sanitizing component; (b) one or more anionic, nonionic, cationic, amphoteric or zwitterionic surfactants or mixtures thereof; (c) a quaternary ammonium alkyl or aryl salt or combinations thereof; and (d) one or more peroxide sources selected from the group comprising of hydrogen peroxide, organic acid peroxides, inorganic acid peroxides, or combinations thereof.

According to a further aspect of the invention there is provided a method for cleaning and disinfecting a food contact hard surface in need of such treatment which includes the step of providing an effective amount of the aqueous cleaning and sanitizing composition described herein to the food contact hard surface requiring cleaning and/or sanitizing treatment. According to a preferred embodiment, the improved process utilizes the ready to use, aqueous cleaning and sanitizing composition outlined above.

While multiple embodiments are disclosed, still other embodiments of the present invention will become apparent to those skilled in the art from the following detailed description, which shows and describes illustrative embodiments of the invention. Accordingly, the detailed description is to be regarded as illustrative in nature and not restrictive.

DETAILED DESCRIPTION OF THE PREFERRED EMBODIMENTS

So that the invention may be more readily understood, certain terms are first defined and certain test methods are described.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

The term "about," as used herein, modifying the quantity of an ingredient in the compositions of the invention or employed in the methods of the invention refers to variation in the numerical quantity that can occur, for example, through typical measuring and liquid handling procedures used for making concentrates or use solutions; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities. All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The term "microbial" or "microbial population" refers to bacterial, fungal, yeast, or viral population or combinations thereof, or any mixture thereof in a laboratory or natural setting.

The term "sanitizing" refers to performing or aiding in bacterial removal, microbial population reduction, or combinations thereof.

The term "disinfecting" refers to performing or aiding in bacterial removal, microbial population reduction, or combinations thereof.

The term "cleaning" refers to performing or aiding in soil removal, bleaching, microbial population reduction, bacterial removal, rinsing, or combination thereof.

The term "surfactant" or "surface active agent" refers to an organic chemical that when added to a liquid changes the properties of that liquid at a surface or interface.

As used herein, the term "use solution" refers to a composition with ingredients found at the concentration intended for use. Use solutions may be provided as "ready to use", with no prior dilution needed, or created from a dilutable concentrate.

The term "actives" or "percent actives" or "percent by weight actives" or "actives concentration" are used interchangeably herein and refers to the concentration of those ingredients involved in cleansing expressed as a percentage minus inert ingredients such as water or salts.

Ready to Use, Aqueous Cleaning, Sanitizing and Disinfecting Compositions

The compositions of the invention are ready to use, aqueous cleaning and sanitizing compositions which provide both a good cleaning benefit as well as excellent sanitizing and disinfecting characteristics particularly to food contact surfaces. In particularly preferred embodiments the sanitizing characteristics of the compositions are sufficient such that they may be classified as Environmental Protection Agency acceptable levels for food contact surfaces, as they demonstrate excellent sanitizing activity against bacteria strains such as *Staphylococcus aureus* (gram positive type pathogenic bacteria) and yet are at acceptable sanitizing property levels to not have any harmful health effects. Thus the characteristics of good cleaning, good sanitizing and good disinfecting are provided in an aqueous cleaning, disinfecting and sanitizing composition having low amounts of isopropyl alcohol. The cleaning, sanitizing and disinfecting effects of the formula with a lower alcohol level are believed to be attributable to the synergistic effects of the selected constituents and in their relative proportions as taught herein. Compositions having such constituents, which provide the effects described herein are not believed to have been hereto known in the art.

The composition according to the instant invention include an alcohol at a low level to permit reduced flammability, wherein the alcohol functions as a wetting agent, a cleaning solvent and an active disinfecting/sanitizing component; one or more anionic, nonionic, cationic, amphoteric or zwitterionic surfactants or mixtures thereof; a quaternary ammonium alkyl or aryl salt or combinations thereof; and one or more peroxide sources selected from the group comprising of hydrogen peroxide, organic acid peroxides, inorganic acid peroxides, or combinations thereof.

According to a further aspect of the invention there is provided a method for cleaning and disinfecting a food contact hard surface in need of such treatment which includes the step of providing an effective amount of the aqueous cleaning, sanitizing and disinfecting composition described herein to the food contact hard surface requiring cleaning and/or sanitizing treatment. According to a preferred embodiment, the improved process utilizes the ready to use, aqueous cleaning and sanitizing composition outlined above.

Low Level of Alcohol

Exemplary and preferred alcohols which may be used in the composition include monohydric alcohols, such as methanol, ethanol, propanol, isopropanol and n-propanol of which isopropyl alcohol is most preferred. Such materials are widely commercially available. Desirably, the alcohol constituent is present from about 1 to about 12.1 wt. %. This low amount of alcohol as described herein is preferred so to provide an overall reduction in flammability in the inventive composition. Most preferably, the alcohol constituent in the present invention is at a low enough level to insure a closed cup flashpoint of greater than 100 degrees Fahrenheit. Yet surprisingly, the inventive compositions provide excellent cleaning, sanitizing and disinfecting properties.

The level of alcohol within the present invention is below the maximum levels specified by the United States Environmental Protection Agency for use as a no-rinse food contact surface sanitizer. Furthermore, the low level of alcohol in the present invention is not used as an active in the ready to use, aqueous cleaning, sanitizing and disinfecting composition of the present invention but rather as a wetting agent and cleaning solvent for removal of oily food soils on food contact surfaces.

The amount of alcohol in the composition is related to the end use of the composition, the amount of anionic, nonionic, cationic, amphoteric or zwitterionic surfactant, quaternary ammonium alkyl or aryl salt, peroxide source in the composition and the presence of optional ingredients in the composition. The amount of alcohol is sufficient to achieve a microbial kill in a short contact time, for example, 30 seconds to 5 minutes and yet insure a closed cup flashpoint of greater than 100 degrees Fahrenheit.

Anionic, Nonionic, Cationic, Amphoteric and Zwitterionic Surfactants

In addition to an alcohol the present cleaning, sanitizing and disinfecting composition for removing oily soils on a food contact surface of the present invention also contains a cleaning surfactant. The compositions according to the invention include one or more anionic, nonionic, cationic, amphoteric or zwitterionic surfactants and mixtures thereof. These include known art surfactants.

The level of surfactant within the present invention is below the maximum levels specified by the United States Environmental Protection Agency for use as a no-rinse food contact surface sanitizer. Furthermore, the surface active agent in the present invention is not used as an active in the ready to use, aqueous cleaning, sanitizing and disinfecting composition of the present invention but rather as a wetting agent and cleaning surfactant for removal of oily food soils on food contact surfaces.

The cleaning surfactants may be a single surfactant or may be a mixture of two or more surfactants. The amount of surfactant in the composition is related to the end use of the composition, the amount of alcohol, quaternary ammonium alkyl or aryl salt, peroxide source in the composition and the presence of optional ingredients in the composition. The amount of alcohol is sufficient to achieve a microbial kill in a short contact time, for example, 30 seconds to 5 minutes.

Useful surfactants include, by way of non limiting example: sodium capryl sulfonate, sodium lauryl sulfate, linear alkyl benzene sulphonates/sodium dodecyl benzene sulfonate, numerous fatty acids which include decanoic acid, octanoic acid, n-pelargonic acid, and particularly alkylpolyglucoside surfactant. An alkylpolyglucoside surfactant is especially useful as a wetting agent and cleaning surfactant in the present invention dues to its known excellent cleaning properties and its stability in quat based formulas. An alkylpolyglucoside surfactant is used at a maximum level of 100 ppm in the ready to use, aqueous cleaning, sanitizing and disinfecting composition of the present invention. Additionally preferred cleaning surfactants are described in the Examples below.

Anionic Cleaning Surfactants

Useful anionic surfactants include, by way of non limiting example: alkali metal salt or alkanolamine salt of a $C_{6-24}$ saturated or unsaturated carboxylic acid, an alkylarylsulfonic acid or an alkyl sulfuric acid, sodium capryl sulfonate, sodium lauryl sulfate, linear alkyl benzene sulphonates/sodium dodecyl benzene sulfonate, decanoic acid, octanoic acid, n-pelargonic acid or mixtures thereof.

The cleaning, sanitizing and disinfecting composition can contain an anionic surfactant component that includes a detersive amount of an anionic surfactant or a mixture of anionic surfactants. The anionic surfactants that can be used according to the invention include any anionic surfactant available in the cleansing industry. Suitable groups of anionic surfactants include sulfonates and sulfates. Suitable surfactants that can be provided in the anionic surfactant component include, but are not limited to, sarcosine derivatives, succinic acid derivatives, carboxylated alcohols, alkyl sulfate and alkyl ether sulfates, sulfonic acid derivatives, diphenyll sulfonate derivatives, alkyl aryl sulfonic acid derivatives, alkyl polyglucoside sulfates or sulfonates.

Other anionic surface active agents not particularly enumerated here may also find use in conjunction with the compounds of the present invention.

Nonionic Cleaning Surfactants

Useful nonionic surfactants include, by way of non limiting example: alkyl polyglucosides in which the alkyl group contains 8-18 carbon atoms, a glycerol fatty acid ester, a polyoxyethylene glycerol fatty acid ester, a polyoxyethylene sorbitan fatty acid ester, a polyethyleneglycol fatty acid ester or a polyoxyethylene polyoxypropylene block copolymer with terminal hydroxyl groups and combinations thereof.

The cleaning, sanitizing and disinfecting composition can contain a nonionic surfactant component that includes a detersive amount of nonionic surfactant or a mixture of nonionic surfactants. Typically, a nonionic surfactant has a hydrophobic region, such as a long chain alkyl group or an alkylated aryl group, and a hydrophilic group comprising an ethoxy and/or other hydrophilic moieties. As defined herein, a “nonionic foam-boosting co-surfactant” has a hydrophobic region having an alkyl group containing six to eighteen carbon atoms, and an average of one to about twenty ethoxy and/or propoxy moieties. Examples of non ionic cleaning surfactants include, but are not limited to, alkyl amine oxide, alkyl ether amine oxide, alkyl alcohol alkoxylates, aryl alcohol alkoxylates, substituted alcohol alkoxylates, block nonionic copolymers, heteric nonionic copolymers, alkanolamides, or polyethoxylated glycerol esters, and mixtures thereof.

Numerous other nonionic surfactants are disclosed in McCutcheon's Detergents and Emulsifiers, 1993 Annuals, published by McCutcheon Division, MC Publishing Co., Glen Rock, N.J., pp. 1-246 and 266-273; in the *CTFA International Cosmetic Ingredient Dictionary, Fourth Ed.*, Cosmetic, Toiletry and Fragrance Association, Washington, D.C. (1991) (hereinafter the *CTFA Dictionary*) at pages 1-651; and in the *CTFA Cosmetic Ingredient Handbook, First Ed.*, Cosmetic, Toiletry and Fragrance Association, Washington, D.C. (1988) (hereafter the *CTFA Handbook*), at pages 86-94, each incorporated herein by reference.

Other nonionic surface active agents not particularly enumerated here may also find use in conjunction with the compounds of the present invention.

Cationic Cleaning Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

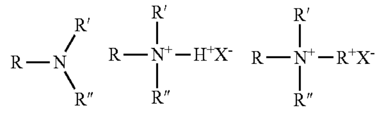

in which, R represents a long alkyl chain, R', R", and R'" may be either long alkyl chains or smaller alkyl or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those of skill in the art and described in "Surfactant Encyclopedia," Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_mR^2_xYLZ$ wherein each $R^1$ is an organic group containing a straight or branched alkyl or alkenyl group optionally substituted with up to three phenyl or hydroxy groups and optionally interrupted by up to four of the following structures:

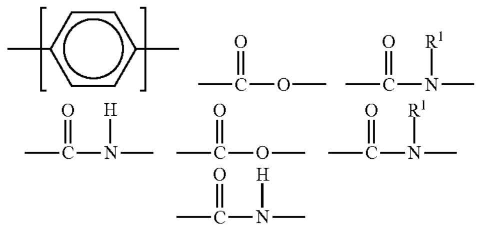

or an isomer or mixture of these structures, and which contains from 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2, or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group is filled by hydrogens.

Y can be a group including, but not limited to:

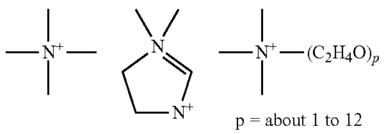

p = about 1 to 12

-continued

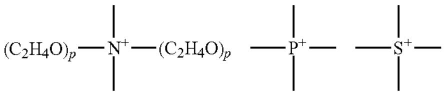

p = about 1 to 12

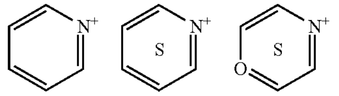

Preferably, L is 1 or 2, with the Y groups being separated by a moiety selected from $R^1$ and $R^2$ analogs (preferably alkylene or alkenylene) having from 1 to 22 carbon atoms and two free carbon single bonds when L is 2. Z is a water soluble anion, such as sulfate, methylsulfate, hydroxide, or nitrate anion, particularly preferred being sulfate or methyl sulfate anions, in a number to give electrical neutrality of the cationic component.

The cleaning, sanitizing and disinfecting composition may contain a cationic surfactant component that includes a detersive amount of cationic surfactant or a mixture of cationic surfactants. Cationic surfactants that can be used in the antimicrobial composition include, but are not limited to, quaternized polysaccharides, alkyl polysaccharides, alkoxylated amines, alkoxylated ether amines, phospholipids, phospholipid derivatives, and mixtures thereof.

Other cationic surface active agents not particularly enumerated here may also find use in conjunction with the compounds of the present invention.

Amphoteric Cleaning Surfactants

Amphoteric, or ampholytic, surfactants contain both a basic and an acidic hydrophilic group and an organic hydrophobic group. These ionic entities may be any of the anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia," Cosmetics & Toiletries, Vol. 104 (2) 69-71 (1989). The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

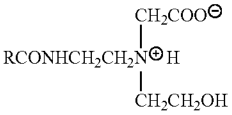

(MONO)ACETATE

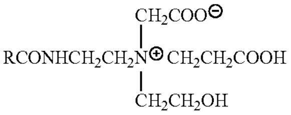

(DI)PROPIONATE

Neutral pH-Zwitterion

AMPHOTERIC SULFONATE

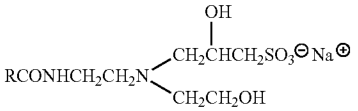

wherein R is an acyclic hydrophobic group containing from 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Preferred amphocarboxylic acids are produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterionic Surfactants.

Long chain N-alkylamino acids are readily prepared by reacting $RNH_2$, in which R.dbd.$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In these, R is preferably an acyclic hydrophobic group containing from 8 to 18 carbon atoms, and M is a cation to neutralize the charge of the anion.

Preferred amphoteric surfactants include those derived from coconut products such as coconut oil or coconut fatty acid. The more preferred of these coconut derived surfactants include as part of their structure an ethylenediamine moiety, an alkanolamide moiety, an amino acid moiety, preferably glycine, or a combination thereof; and an aliphatic substituent of from 8 to 18 (preferably 12) carbon atoms. Such a surfactant can also be considered an alkyl amphodicarboxylic acid. Disodium cocoampho dipropionate is one most preferred amphoteric surfactant and is commercially available under the tradename Miranol™ FBS from Rhodia Inc., Cranbury, N.J. Another most preferred coconut derived amphoteric surfactant with the chemical name disodium cocoampho diacetate is sold under the tradename Miranol C2M-SF Conc., also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Zwitterionic Cleaning Surfactants

Zwitterionic surfactants can be thought of as a subset of the amphoteric surfactants. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion, a negative charged carboxyl group, and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate. Betaine and sultaine surfactants are exemplary zwitterionic surfactants for use herein.

A general formula for these compounds is:

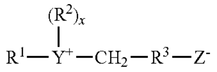

wherein R1 contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; R.sup.2 is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecyl sulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl) sulfonio]-propane-1-phosphate; 3-[P,P-dimethyl-P-dodecylphosphonio]-propane-1-phosphonate; and S [N,N-di (3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

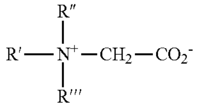

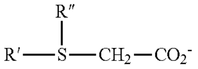

-continued

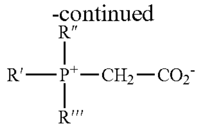

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine. Sultaines useful in the present invention include those compounds having the formula (R(R1)$_2$N.sup.+$R^2SO^3$—, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Quaternary Ammonium Alkyl or Aryl Salt

In addition to an alcohol and cleaning solvent the present cleaning, sanitizing and disinfecting composition for removing oily soils on a food contact surface of the present invention also contains a quaternary ammonium alkyl or aryl salt as a primary antimicrobial constituent.

The level of quaternary ammonium alkyl or aryl salt within the present invention is below the maximum levels specified by the United States Environmental Protection Agency for use as a no-rinse food contact surface sanitizer. Furthermore, the quaternary ammonium alkyl or aryl salt in the present invention is used as an antimicrobial active in the ready to use, aqueous cleaning, sanitizing and disinfecting composition of the present invention for removal of oily soils on food contact surfaces.

The amount of quaternary ammonium alkyl or aryl salt in the composition is related to the end use of the composition, the amount of alcohol, cleaning surfactant, peroxide source in the composition and the presence of optional ingredients in the composition. The amount of quaternary ammonium alkyl or aryl salt is sufficient to achieve a microbial kill in a short contact time, for example, 30 seconds to 5 minutes.

Useful quaternary ammonium alkyl or aryl salts include, by way of non limiting example: $C_{6-24}$ alkyl dimethyl benzyl ammonium chloride, octyl decyl dimethyl ammonium chloride, dioctyl dimethyl ammonium chloride, didecyl dimethyl ammonium chloride, or mixtures thereof.

Other quaternary ammonium alkyl or aryl salts not particularly enumerated here may also find use in conjunction with the compounds of the present invention.

Peroxide Source

In addition to an alcohol, cleaning solvent and a quaternary ammonium alkyl or aryl salt the present cleaning, sanitizing and disinfecting composition for removing oily soils on a food contact surface of the present invention also contains a peroxide source as a secondary antimicrobial constituent.

The level of peroxide source within the present invention is below the maximum levels specified by the United States Environmental Protection Agency for use as a no-rinse food contact surface sanitizer. Furthermore, the peroxide source in the present invention is used as a secondary antimicrobial active in the ready to use, aqueous cleaning, sanitizing and disinfecting composition of the present invention for removal of oily soils on food contact surfaces.

The amount of peroxide source in the composition is related to the end use of the composition, the amount of alcohol, cleaning surfactant, quaternary ammonium alkyl or aryl salt in the composition and the presence of optional ingredients in the composition. The amount of peroxide source is sufficient to achieve a microbial kill in a short contact time, for example, 30 seconds to 5 minutes.

Useful peroxide sources include, by way of non limiting example: hydrogen peroxide, organic acid peroxides, inorganic acid peroxides or mixtures thereof. Other peroxide sources not particularly enumerated here may also find use in conjunction with the compounds of the present invention.

The ready to use, aqueous cleaning, sanitizing and disinfecting composition of the invention particularly includes hydrogen peroxide as the secondary antimicrobial constituent. The hydrogen peroxide is present in no more than about 5 wt. % based on the total weight of the ready to use aqueous cleaning, sanitizing and disinfecting composition. Hydrogen peroxide is present in an amount of from about 0.001 wt. % to about 5 wt. %, yet more desirably about 0.001 wt. % to about 1 wt. %, yet more desirably about 0.001 wt. % to about 0.2 wt. %. A minimum of 0.001 wt. % hydrogen peroxide is required to achieve antimicrobial properties to remove oily soils from food contact surfaces. Although it is believed lower levels of disinfection against a narrower range of microorganisms may be attained with lesser amounts of hydrogen peroxide than the preferred minimum amount of 0.001 wt. %. Desirably, the hydrogen peroxide is provided in an amount between about 0.001 wt. % to about 0.2 wt. %. This amount is preferred in order to allow for a slight loss of hydrogen peroxide during the shelf life of the ready to use, aqueous cleaning, sanitizing and disinfecting composition. Higher concentrations of hydrogen peroxide may be provided, however, they are to be avoided, as it has been observed that such higher levels will cause an increase in health concerns and is therefore not desirable.

An acid may also be present as a peroxide source in the inventive composition. The acid may be an inorganic acid peroxide or may be an organic acid peroxide including organic compounds comprising one or more carboxylic groups. Mixtures of acids are also contemplated as being useful. These one or more acids present provide the desired characteristic to the compositions. Such an acid is present in effective amounts to establish a targeted pH range for compositions according to the invention. While any of a number of acids may be used, particularly preferred acids include those described amongst the Examples listed below.

The cleaning, sanitizing and disinfecting compositions of the invention are adjusted to a pH range from about 3 to about 12. Such may be achieved primarily by the addition of effective amounts of the one or more inorganic acids and/or organic acids, as denoted above. Such pH may also be maintained, for example, by the inclusion of one or more pH buffers as described with reference to the optional constituents.

Diluent

As the inventive compositions are aqueous in nature, water is a major constituent. Desirably deionized water is used. Water is added in a sufficient amount to provide 100 wt. % of the compositions.

The constituents described herein are known to the art, and are commercially available from various sources including those described in *McCutcheon's Emulsifiers and Detergents* (Vol. 1), *McCutcheon's Optional constituents* (Vol. 2), North American Edition, 1991; Kirk-Othmer, *Encyclopedia of Chemical Technology,* 3rd Ed., Vol. 22, the contents of which are herein incorporated by reference. For any particular composition, any optional ingredients should be compatible with the other ingredients present.

Optional Constituents

The cleaning, sanitizing and disinfecting compositions of the present invention may include minor amounts of one or more optional constituents, as described herein. Useful optional constituents include, by way of non limiting example: sequestering or scale removing agent, non-aqueous co-solvent, peroxide or peroxyacid stabilizing agent, pH buffering system and the like. As such, in some embodiments, the cleaning, sanitizing and disinfecting composition including alcohols, cleaning surfactants, quaternary ammonium alkyl or aryl salts and peroxide sources may provide a large amount, or even all of the total weight of the cleaning, sanitizing and disinfecting composition, for example, in embodiments having few or no additional optional constituents disposed therein. The optional constituents provide desired properties and functionalities to the cleaning, sanitizing and disinfecting composition. For the purpose of this application, the term "optional constituents" include a material that when dispersed or dissolved in a use and/or concentrate solution, such as an aqueous solution, provides a beneficial property in a particular use. Some particular examples of optional constituents are discussed in more detail below, but it should be understood by those of skill in the art and others that the particular materials discussed are given by way of example only, and that a broad variety of other optional constituents may be used. For example, many of the optional constituents discussed below relate to materials used in disinfecting and/or cleansing applications, but it should be understood that other embodiments may include optional constituents for use in other applications.

Sequestering or Scale Removing Agent

An effective amount of a sequestering agent or a scale removing agent, including agents known to the art such as gluconic acid, acetic acid, citric acid, lactic acid, EDTA, NTA, HEDTA, acrylic acid polymers, methacylic acid polymers, acrylic acid-methacrylic acid copolymers, and the water-soluble sodium, potassium or ammonium salts thereof and including sodium, potassium and ammonium phosphate or mixtures thereof may be used. While the composition of the invention generally does not require a sequestering or scale removing agent an effective amount of a sequestering or scale removing agent may provide benefit for removing scale build up on surfaces to be cleaned and/or sanitized in addition to conditioning a solution where hard water has been added as a diluent.

Non Aqueous Co-Solvent

An effective amount of a non aqueous co-solvent, including solvents known to the art such as polypropylene glycols with a degree of polymerization from 10 to 200, benzyl alcohol, methyl benzyl alcohol, alpha phenyl ethanol, ethylene glycol monobutyl ether, diethylene glycol monobutyl ether, ethylene glycol phenyl ether, propylene glycol phenyl ether or mixtures thereof may be used. While the composition of the invention generally does not require a non aqueous co-solvent an effective amount of a non-aqueous co-solvent may provide benefit for increasing the solubility of soils to be cleaned and/or supporting the delivery of antimicrobial components in a sanitizing or disinfecting formula to the microbial species to be killed in the cleaning, sanitizing and/or disinfecting process. Preferably, the non aqueous co-solvent is included in the cleaning, sanitizing and disinfecting composition of the present invention at less than 1 wt. % of the total weight of the composition.

Peroxide or Peroxyacid Stabilizing Agent

An effective amount of a peroxide or peroxyacid stabilizing agent, including hydroxyethylidene 1,1-diphosphonic acid (HEDP), dipicolinic acid (DPA), 2-Aminoethylphosphonic acid (AEPn), Dimethyl methylphosphonate (DMMP), ATMP: Amino tris(methylene phosphonic acid) (ATMP), EDTMP: Ethylenediamine tetra(methylene phosphonic acid) (EDTMP), Tetramethylenediamine tetra(methylene phosphonic acid) (TDTMP), Hexamethylenediamine tetra(methylene phosphonic acid) (HDTMP), Diethylenetriamine penta(methylene phosphonic acid) (DTPMP), Phosphonobutane-tricarboxylic acid (PBTC), N-(phosphonomethyl)iminodiacetic acid (PMIDA), 2-carboxyethyl phosphonic acid (CEPA), 2-Hydroxyphosphonocarboxylic acid (HPAA), Amino-tris-(methylene-phosphonic acid) (AMP) or mixtures thereof may be used. While the composition of the invention generally does not require a peroxide or peroxyacid stabilizing agent an effective amount of a peroxide or peroxyacid stabilizing agent may provide benefit for insuring the peroxide or peroxyacid components in a formulation have the desirable stability with regard to time or temperature.

pH Buffering System

An effective amount of a pH buffering composition so to maintain the pH of the inventive compositions may also be added. While the composition of the invention generally does not require a pH buffering composition, its use may provide the benefit of hard water ion sequestration, should the inventive composition be diluted with further water by the consumer or other end user. Any pH buffering compound or pH buffer composition which is compatible with the aqueous compositions taught herein may be used, and many of these are well known to the art. Examples of such useful pH buffer compounds and/or pH buffering systems or compositions include organic acids, mineral acids, alkaline metal and alkaline earth salts, phosphoric acid, metal carbonates, or mixtures thereof. Such buffering compositions keep the pH ranges of the compositions of the present invention within acceptable limits. The desired pH of the composition of the present invention is between about 3 to about 12. Other pH buffering compositions not particularly elucidated here may also be used. Moreover, the addition of a buffering composition is desirable in certain cases wherein long term, i.e., prolonged storage, is to be anticipated for a composition, as well as ensuring the safe handling of the aqueous composition.

The aqueous cleaning, sanitizing and disinfecting compositions according to the invention may include minor amounts of one or more optional additives including those known to the art as useful for such compositions. These optional constituents, if present, desirably comprise not more than a total of about 2.5 wt. %, based on the total weight of the inventive compositions and more desirably are present in lesser amounts.

Method of Use of Cleaning, Sanitizing and Disinfecting Composition

The aqueous cleaning, sanitizing and disinfecting compositions according to the invention is desirably provided as a ready to use product which may be directly applied to a food contact surface. By way of example, food contact surfaces include surfaces associated with kitchen environments, food processing plants and the like. Such surfaces as described herein are to be understood as being recited by way of illustration and not by way of limitation.

The compositions according to the invention are useful in the cleaning and/or disinfecting of food contact surfaces, especially hard surfaces, having deposited oily soils thereon. In such a process, cleaning and disinfection of such surfaces comprises the step of applying the cleaning, sanitizing and disinfecting composition as taught herein to the stained surface. Afterwards, the compositions are optionally but desirably wiped, scrubbed or otherwise physically contacted with the food contact surface, and further optionally, may be subsequently rinsed from such a cleaned and disinfected food contact surface.

The cleaning, sanitizing and disinfecting composition provided according to the invention is conveniently provided as a ready to use product in a manually operated spray dispensing container. Such a typical container is generally made of synthetic polymer plastic material and includes a spray nozzle, a dip tube and associated pump dispensing parts and is thus ideally suited for use in a consumer "spray and wipe" application. In such an application, the consumer generally applies an effective amount of the cleaning composition using the pump and, within a short time thereafter, wipes off the treated area with a rag, towel, or sponge, usually a disposable paper towel or sponge. In certain applications, however, especially where undesirable stain deposits are heavy, the cleaning composition according to the invention may be left on the stained area until it has effectively loosened the stain deposit after which it may then be wiped off, rinsed off, or otherwise removed. For particularly heavy deposits of such undesired stains, multiple applications may also be used.

Whereas compositions of the present invention are intended as a ready to use product and is not specifically intended to be diluted into a further volume of water, nothing in this specification shall be understood as to limit the use of the compositions with a further amount of water to form a cleaning and disinfecting solution. In such a proposed diluted cleaning solution, the greater the proportion of water added to form the cleaning and disinfecting dilution, the greater may be the reduction of the rate and/or efficacy of the formed cleaning and disinfecting solution in the treatment of a food contact surface. Thus, an undesirable reduction in disinfectant efficacy may result and accordingly, longer residence times on the surface to be treated may be required in order to satisfactorily loosen stains and soils and provide a sufficient disinfecting effect. Alternatively, the usage of greater amounts and/or multiple treatments with such a disinfecting solution may be necessitated. Conversely, nothing in the specification shall be also understood to limit the forming of a "super-concentrated" cleaning, sanitizing and disinfecting composition based upon the composition described above. Such a super concentrated composition is essentially the same as the compositions described above except in that they include a lesser amount of water.

The invention has been shown and described herein in what is considered to be the most practical and preferred embodiment. The applicant recognizes, however, that departures may be made therefrom within the scope of the invention and that obvious modifications will occur to a person skilled in the art. The examples which follow are intended for purposes of illustration only and are not intended to limit the scope of the invention. All references cited herein are hereby incorporated in their entirety by reference.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

The following methods were used in the preparation and testing of the examples:

Germicidal and Detergent Sanitizing Action of Disinfectants

The purpose of the germicidal and detergent sanitizing action of disinfectants test is to determine the efficacy of products used for sanitizing pre-cleaned, non-porous food contact surfaces. The determination of disinfection was evaluated using the AOAC Method 960.09 *Germicidal and Detergent Sanitizing Action of Disinfectants*. The test entails a suspension test wherein 1 part test suspension is added to 99 parts sanitizer to mimic flooding a pre-cleaned surface that may have a few remaining organisms with a sanitizer. Required test organisms specifically include, *Staphylococcus aureus* ATCC 6538 and *Escherichia coli* ATCC 11229. To determine efficacy the sanitizer must demonstrate greater than or equal to a 5-log (≥99.999%) reduction of tested organisms with a 30 second exposure time.

Non-Food Contact Sanitizing Method Sanitizer Test for Inanimate, Non-Food Contact Surfaces The purpose of the non-food contact sanitizing method sanitize test for inanimate, non-food contact surfaces is to evaluate the efficacy of sanitizers on pre-cleaned inanimate, nonporous, non-food contact surfaces. The determination of disinfection was evaluated using the ASTM E 1153 *Standard Test Method for Efficacy of Sanitizers Recommended for Inanimate Non-Food Contact Surfaces* and EPA DIS/TSS-10 *Sanitizer Test for Inanimate Surfaces*. The test entails a carrier test in which sanitizer is applied to test organisms dried on a coupon. Required test organisms specifically include, *Staphylococcus aureus* ATCC 6538 and *Klebsiella pneumonia* ATCC 4352 or *Enterobacter aerogenes* 13048. To determine efficacy the sanitizer must demonstrate greater than or equal to a 3-log (≥99.9%) reduction of tested organisms with a 5 minute exposure time.

Use Dilution Method

The purpose of the use dilution method is to evaluate the efficacy of disinfectants. The determination of disinfection was evaluated using AOAC Official Method 955.14*: Testing Disinfectants against Salmonella Enterica* (*formerly Salmonella choleraesuis*), AOAC Official Method 955.14*: Testing Disinfectants against Staphylococcus aureus*, AOAC Official Method 964.02*: Testing Disinfectants against Pseudomonas aeruginosa* and following U.S. EPA Test Guideline OCSPP 810.2200 for *Disinfectants for Public Health Usage*. The test entails a carrier test in which test organisms are dried on carriers and then the carrier is submerged in disinfectant. Required test organisms include, *Staphylococcus aureus* ATCC 6538, *Salmonella enterica* ATCC 10708 and *Pseudomonas aeruginosa* 13048. To determine efficacy the disinfectant must kill the test organism on ≥59 of 60 carriers tested for each of the three required test organisms, for the claimed exposure time.

The following Figures demonstrate efficacy data of the present cleaning, sanitizing and disinfecting composition, using alcohol, surfactants, quaternary ammonium alkyl or aryl salts and peroxide sources.

FIG. 1 illustrates the compositions of formulas 1-7 used in the examples listed below. FIG. 2 illustrates the compositions of formulas 8-13 used in the examples listed below. Formulas 9a and 9b in FIG. 2 were respectively measured at a pH of 3.08 and 3.83 wherein formula 9b was adjusted with sodium hydroxide. FIG. 3 illustrates the compositions of formulas 14-19 used in the examples listed below. Formulas 19a and 19b in FIG. 3 were respectively measured at a pH of 3.03 and 4.07 wherein formula 19b was adjusted with sodium hydroxide. FIG. 4 illustrates the compositions of formulas 20-26 used in the examples listed below. FIG. 5 illustrates the compositions of formulas 27-32 used in the examples listed below.

FIG. 6 and Table 1: Second Food Contact Sanitizing Efficacy Determination

FIG. 6 illustrates the results for microbial kill efficacy against *Staphylococcus aureus* ATCC 6538 and *Escherichia coli* ATCC 11229 by comparing the seven test samples of ready to use cleaning, sanitizing and disinfecting compositions found in FIG. 1. For the test samples, acidic formulas were tested and the results demonstrate that formulas with a lower pH achieved a higher level of microbial kill efficacy for both species tested. Table 1 shows the microbial kill data used in FIG. 6.

TABLE 1

| | *Staphylococcus aureus* ATCC 6538 Log Reduction | *Escherichia coli* ATCC 11229 Log Reduction |
|---|---|---|
| Formula I | >5.99 | >6.1 |
| Formula 2 | >5.99 | >6.1 |
| Formula 3 | 2.97 | 4.23 |
| Formula 4 | 1.51 | 0.4 |
| Formula 5 | >5.99 | >6.1 |
| Formula 6 | >5.99 | >6.1 |
| Formula 7 | 2.86 | 0.1 |

Figure 7:
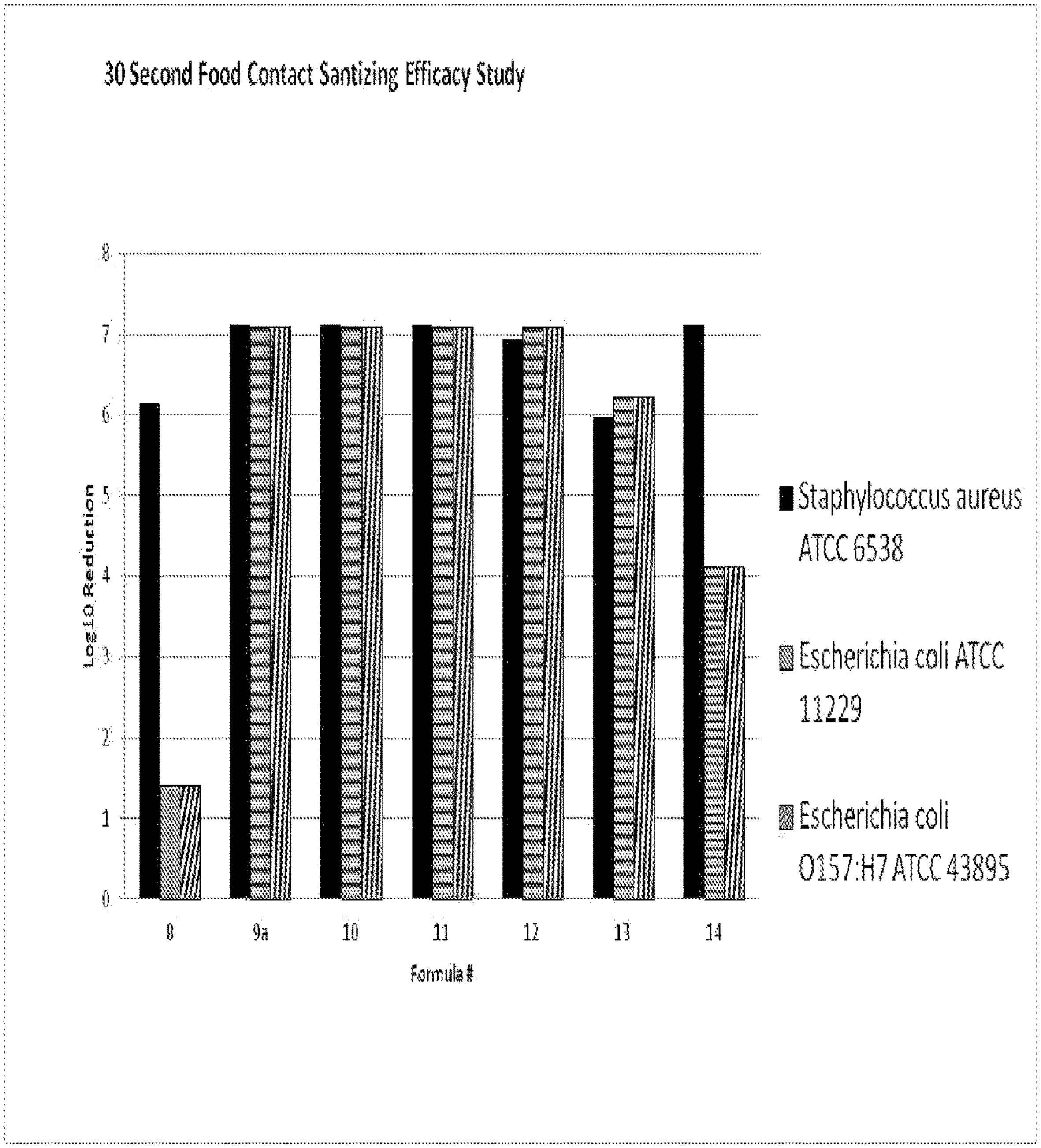
FIG. 7 is a graph depicting the results of a 30 second food contact sanitizing test measuring microbial kill efficacy for ready to use solutions containing isopropyl alcohol against bacterial strains of *S. aureus* and *E. coli* in solution.

FIG. 7 and Table 2: 30 Second Food Contact Sanitizing Efficacy Determination FIG. 7 illustrates the results for microbial kill efficacy against *Staphylococcus aureus* ATCC 6538, *Escherichia coli* ATCC 11229 and *Escherichia coli* O157:H7 ATCC 43895 by comparing the seven test samples of ready to use cleaning, sanitizing and disinfecting compositions found in FIG. 2. For the test samples, acidic formulas were tested and the results demonstrate that formulas with a lower pH achieved a higher level of microbial kill efficacy for both species tested. Table 2 shows the microbial kill data used in FIG. 7.

TABLE 2

| | *Staphylococcus aureus* ATCC 6538 Log Reduction | *Escherichia coli* ATCC 11229 Log Reduction | *Escherichia coli* O157:H7 ATCC 43895 Log Reduction |
|---|---|---|---|
| Formula 8 | 6.13 | 1.42 | 1.42 |
| Formula 9a | >7.11 | >7.10 | >7.10 |
| Formula 10 | >7.11 | >7.10 | >7.10 |

TABLE 2-continued

| | *Staphylococcus aureus* ATCC 6538 Log Reduction | *Escherichia coli* ATCC 11229 Log Reduction | *Escherichia coli* O157:H7 ATCC 43895 Log Reduction |
|---|---|---|---|
| Formula 11 | >7.11 | >7.10 | >7.10 |
| Formula 12 | >6.94 | >7.10 | >7.10 |
| Formula 13 | >5.97 | 6.23 | 6.23 |
| Formula 14 | >7.11 | 4.12 | 4.12 |

Figure 8:
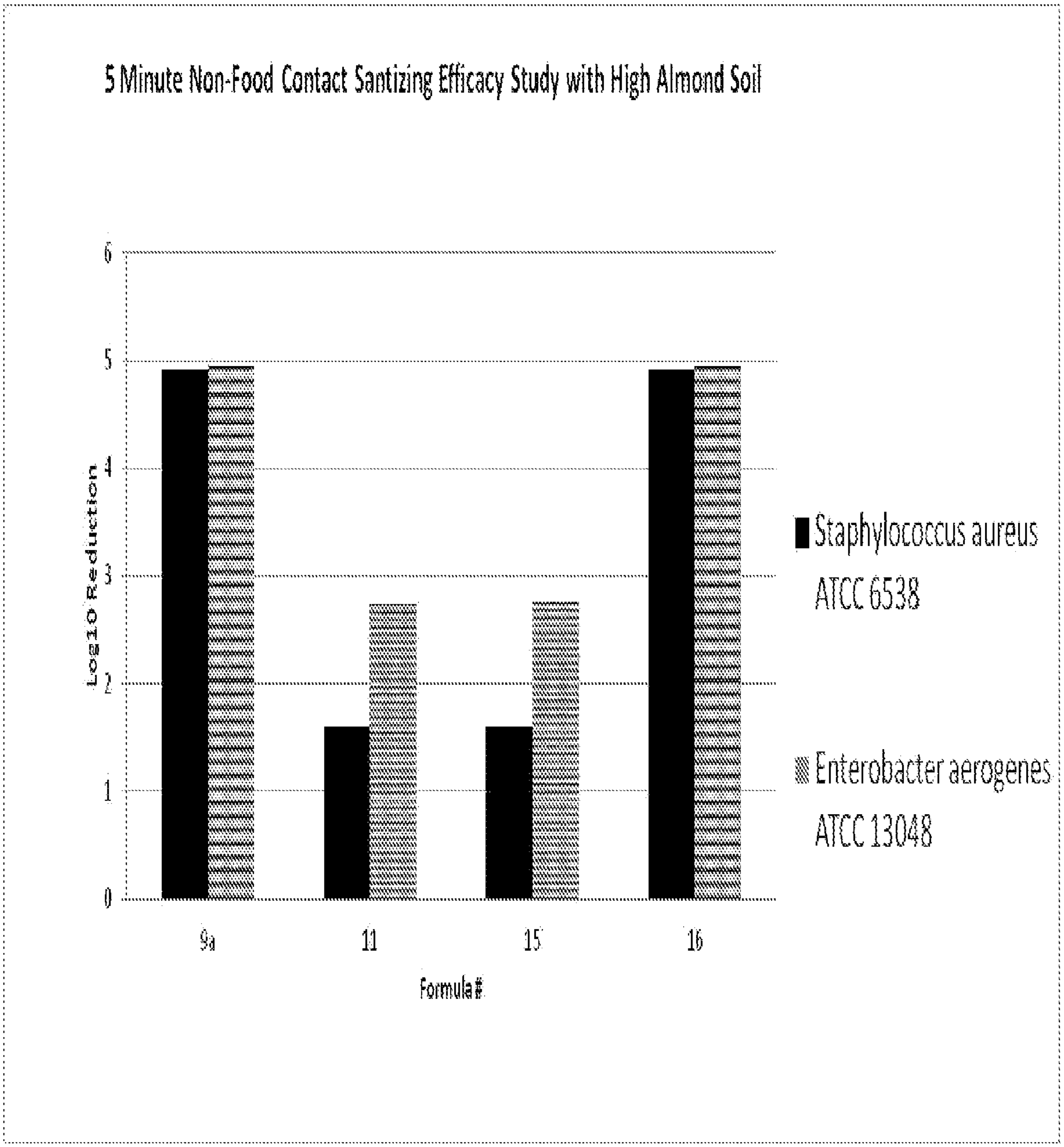
FIG. 8 is a graph depicting the results of a 5 minute non-food contact sanitizing test measuring the microbial kill efficacy for ready to use solutions containing isopropyl alcohol against bacterial strains of *S. aureus* and *E. aerogenes* in the presence of food soil.

FIG. 8 and Table 3: 5 Minute Non-Food Contact Sanitizing Efficacy Determination FIG. 8 illustrates the results for microbial kill efficacy against *Staphylococcus aureus* ATCC 6538 and *Enterobacter aerogenes* ATCC 13048 in the presence of ground almond food soil by comparing four test samples of ready to use cleaning, sanitizing and disinfecting compositions containing isopropyl alcohol found in FIG. 2 and FIG. 3. Results of the test show that fatty acid components lose microbial efficacy in the presence of oily food soils while higher acidity (lower pH) formulations increase microbial kill efficacy with a low isopropyl alcohol formulation. Table 3 shows the microbial kill data used in FIG. 8.

TABLE 3

| | *Staphylococcus aureus* ATCC 6538 Log Reduction | *Enterobacter aerogenes* ATCC 6538 Log Reduction |
|---|---|---|
| Formula 9a | >4.91 | >4.94 |
| Formula 11 | 1.6 | 2.74 |
| Formula 15 | 1.6 | 2.76 |
| Formula 16 | >4.91 | >4.94 |

Figure 9:
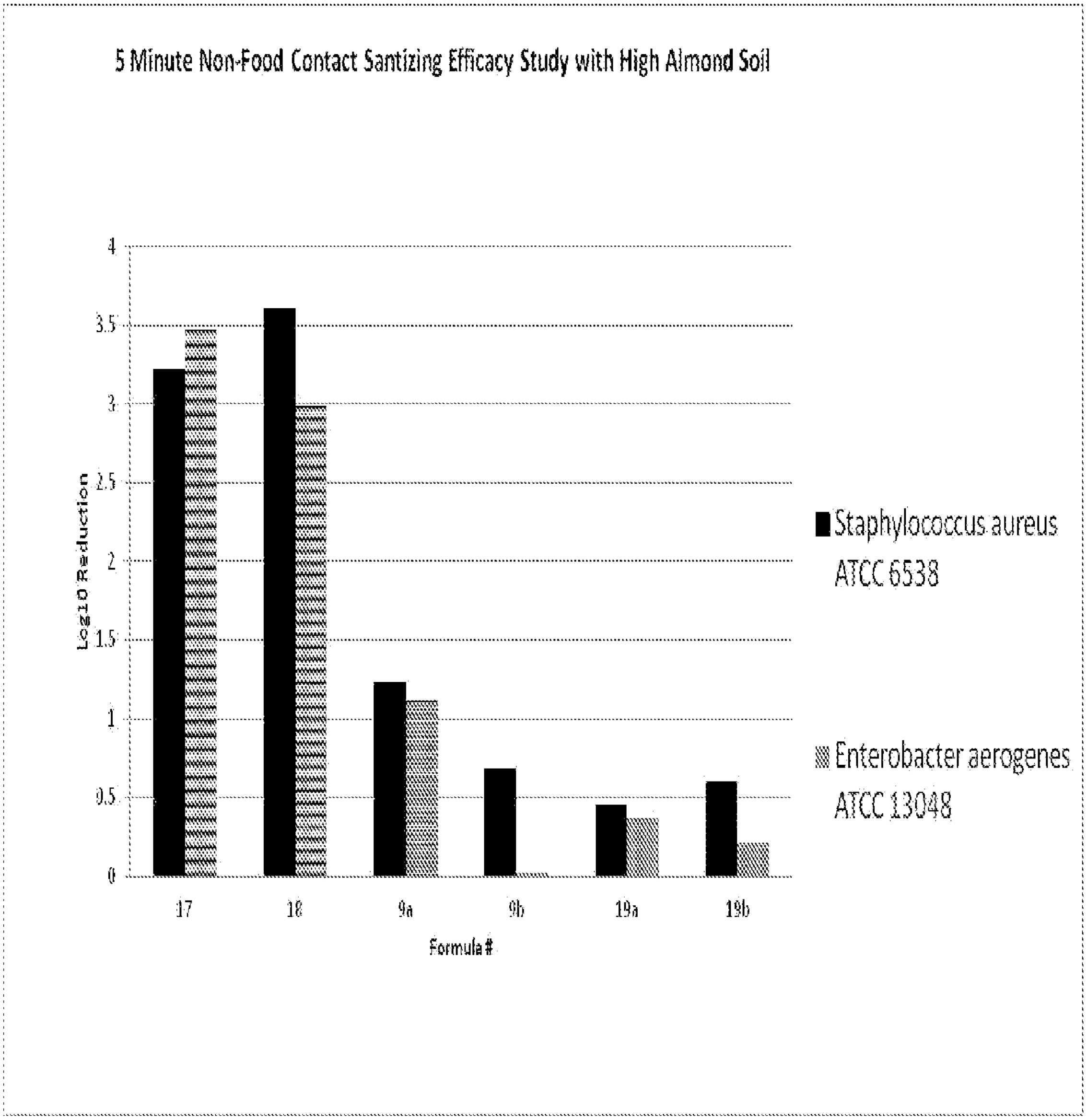
FIG. 9 is a graph depicting the results of a 5 minute non-food contact sanitizing test measuring the microbial kill efficacy for ready to use solutions containing isopropyl alcohol against bacterial strains of *S. aureus* and *E. aerogenes* in the presence of food soil in both acidic and alkaline pH alcohol formulations.

FIG. 9 and Table 4: 5 Minute Non-Food Contact Sanitizing Efficacy Determination FIG. 9 illustrates the results for microbial kill efficacy against *Staphylococcus aureus* ATCC 6538 and *Enterobacter aerogenes* ATCC 13048 in the presence of ground almond food soil by comparing six test samples of ready to use cleaning, sanitizing and disinfecting compositions containing isopropyl alcohol found in FIG. 2 and FIG. 3. Results of the test show the relative microbial kill efficacy of both acidic and alkaline based formulas. Efficacy of alkaline formulas using low alcohol levels and containing various antimicrobial additives show increased microbial kill efficacy versus acid based formulas. Table 4 shows the microbial kill data used in FIG. 9.

TABLE 4

| | *Staphylococcus aureus* ATCC 6538 Log Reduction | *Enterobacter aerogenes* ATCC 13048 Log Reduction |
|---|---|---|
| Formula 17 | 3.22 | >3.47 |
| Formula 18 | 3.61 | >2.99 |
| Formula 9a | 1.23 | 1.12 |
| Formula 9b | 0.68 | 0.02 |
| Formula 19a | 0.46 | 0.37 |
| Formula 19b | 0.6 | 0.21 |

Figure 10:
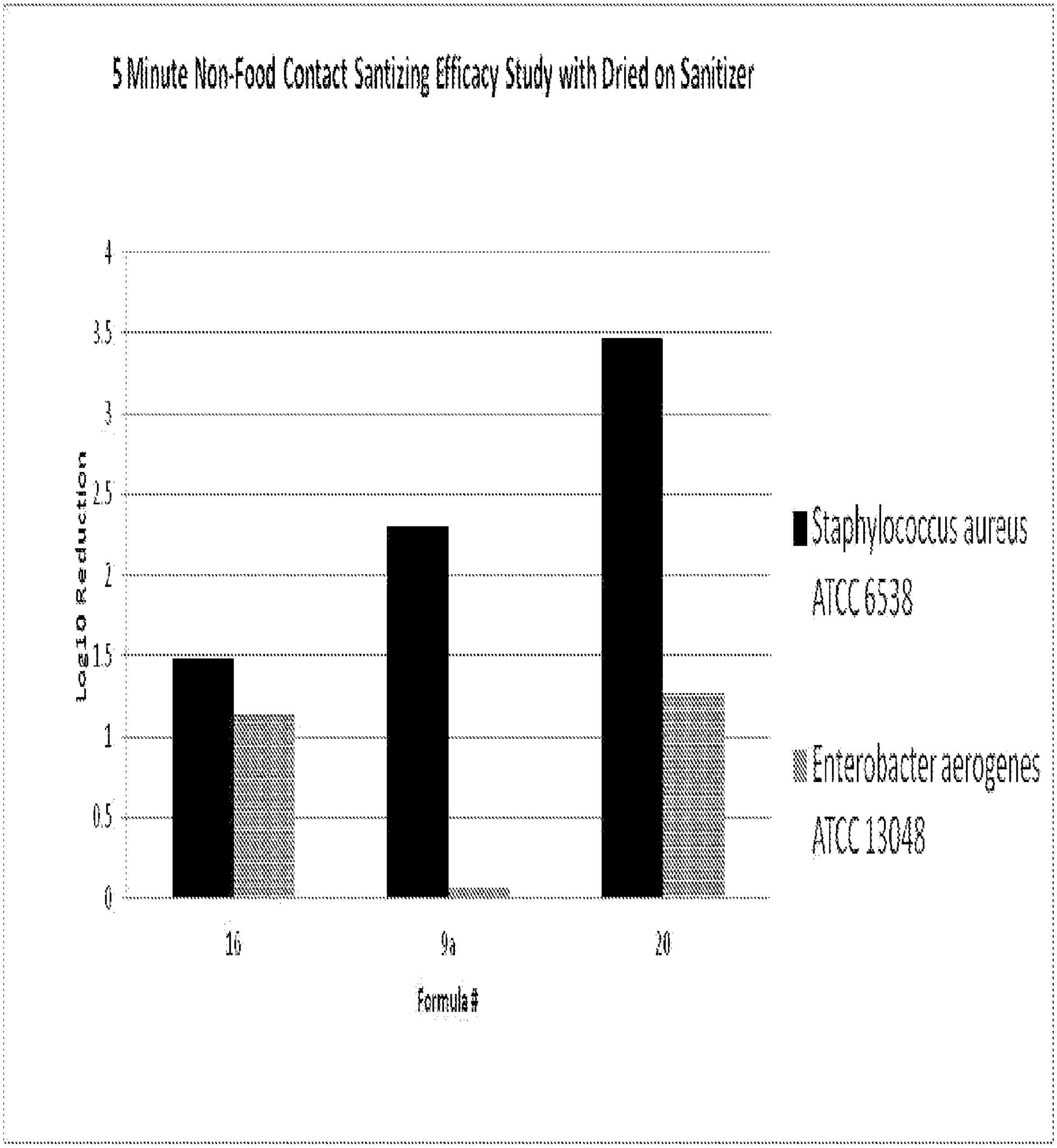
FIG. 10 is a graph depicting the results of a 5 minute non-food contact sanitizing test measuring the microbial kill efficacy for ready to use solutions containing isopropyl alcohol dried onto stainless steel panels against bacterial strains of *S. aureus* and *E. aerogenes.*

FIG. 10 and Table 5: 5 Minute Non-Food Contact Sanitizing Efficacy with Dried on Sanitizer Determination FIG. 10 illustrates the results for microbial kill efficacy against *Staphylococcus aureus* ATCC 6538 and *Enterobacter aerogenes* ATCC 13048 by comparing three test compositions of ready to use cleaning, sanitizing and disinfecting solutions containing isopropyl alcohol, found in FIGS. 2-4, which are dried onto stainless steel panels prior to inoculation with the microbial solutions. Results of the test show continued efficacy of residual formula components after the formulations have completely dried down onto the stainless steel surface. The results illustrate that alkaline formulas with lower isopropyl alcohol levels and various antimicrobial additives show increased efficacy compared to higher alcohol formulations and acidic low isopropyl alcohol formulations. Table 5 shows the microbial kill data used in FIG. 10.

TABLE 5

| | *Staphylococcus aureus* ATCC 6538 Log Reduction | *Enterobacter aerogenes* ATCC 13048 Log Reduction |
|---|---|---|
| Formula 16 | 1.49 | 1.14 |
| Formula 9a | 2.31 | 0.07 |
| Formula 20 | 3.47 | 1.27 |

Figure 11:
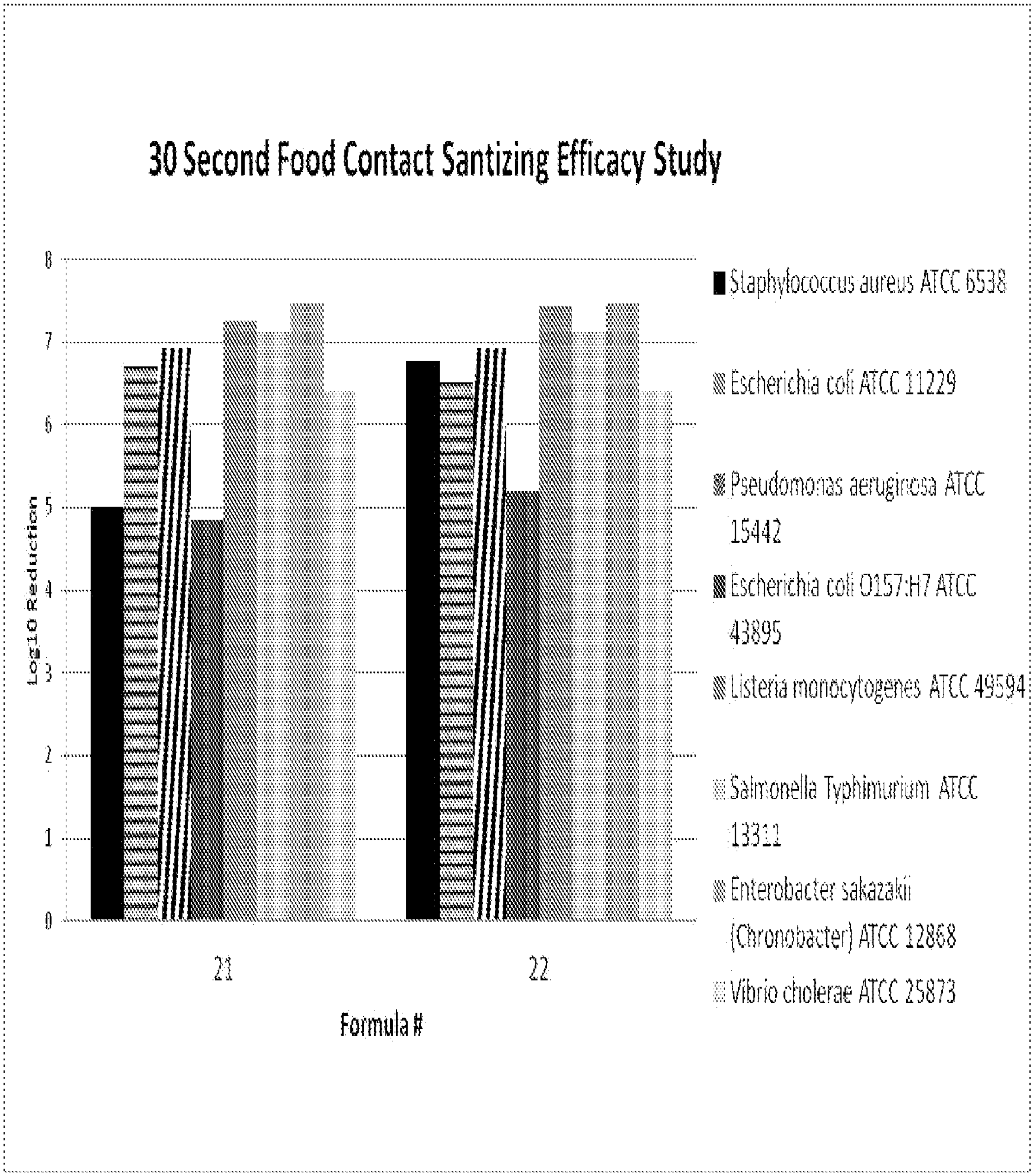
FIG. 11 is a graph depicting the results of a 30 second food contact sanitizing test measuring the microbial kill efficacy for ready to use solutions containing isopropyl alcohol against bacterial strains of *S. aureus, E. coli, P. aeruginosa, E. coli* O157:H7, *L. monocytogenes, S. typhimurium, E. sakazaki* and *V. cholera* in solution.

FIG. 11 and Table 6: 30 Second Food Contact Sanitizing Efficacy Determination FIG. 11 illustrates the results for microbial kill efficacy against *Staphylococcus aureus* ATCC 6538, *Escherichia coli* ATCC 11229, *Pseudomonas aeruginosa* ATCC 15442, *Escherichia coli* O157:H7 ATCC 43895, *Listeria monocytogenes* ATCC 49594, *Salmonella Typhimurium* ATCC 13311, *Enterobacter sakazakii* (Chronobacter) ATCC 12868 and *Vibrio cholerae* ATCC 25873 by comparing two test samples of ready to use cleaning, sanitizing and disinfecting compositions containing isopropyl alcohol found in FIG. 4. Results of the test show near equivalent microbial kill efficacy comparing lower alcohol formulations with optimized formulations at both alkaline and acidic pH levels. Table 6 shows the microbial kill data used in FIG. 11.

TABLE 6

| | *Staphylococcus aureus* ATCC 6538 Log Reduction | *Escherichia coli* 11229 Log Reducon | *Pseudomonas aeruginosa* ATCC 15442 Log Reduction | *Escherichia coli* O157:H7 ATCC 43895 Log Reduction | *Listeria monocytogenes* ATCC 49594 Log Reduction | *Salmonella Typhimurium* ATCC 13311 Log Reduction | *Enterobacter sakazakii* (*Chronobacter*) ATCC 12868 Log Reduction | *Vibrio cholerae* ATCC 25873 Log Reduction |
|---|---|---|---|---|---|---|---|---|
| Formula 21 | 5.01 | >6 70 | >6.92 | 4.86 | 7.26 | >7.12 | >7.48 | >6.41 |
| Formula 22 | >6.77 | >6.52 | >6.92 | 5.21 | >7.43 | >7.12 | >7.48 | >6.41 |

Figure 12:
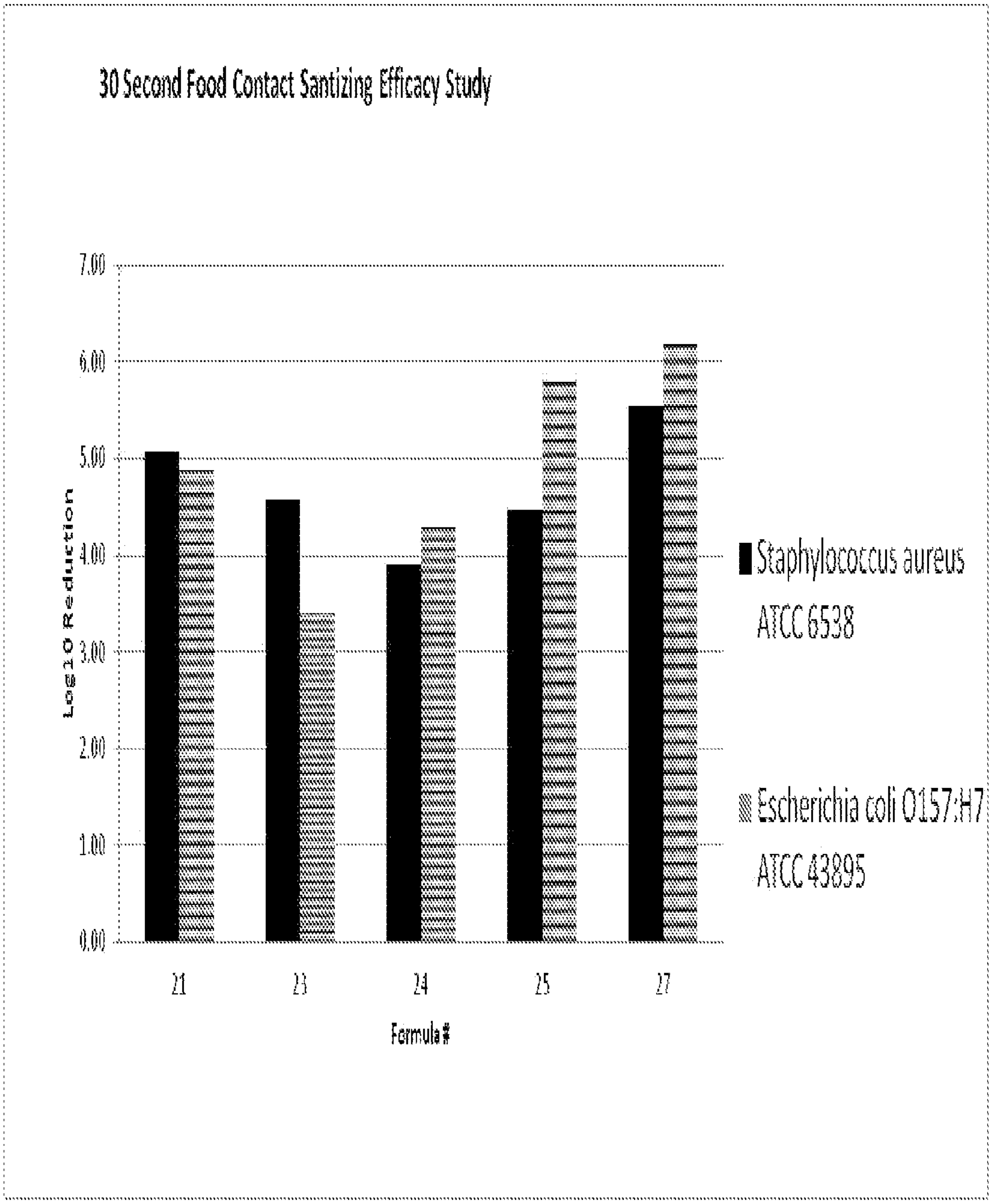
FIG. 12 is a graph depicting the results of a 30 second food contact sanitizing test measuring the microbial kill efficacy for ready to use solutions containing isopropyl alcohol against bacterial strains of *S. aureus* and *E. coli* O157:H7 in alkaline and neutral pH alcohol formulations.

FIG. 12 and Table 7: 30 Second Food Contact Sanitizing Efficacy Determination FIG. 12 illustrates the results for microbial kill efficacy *Staphylococcus aureus* ATCC 6538 and *Escherichia coli* O157:H7 ATCC 43895 by comparing test samples of ready to use cleaning, sanitizing and disinfecting compositions containing isopropyl alcohol found in FIG. 4 and FIG. 5. Results of the test show relative microbial kill efficacy of different alkaline and neutral pH formulations with a low level of isopropyl alcohol. Microbial kill efficacy of neutral (Formula 26 in FIG. 4, pH 6) formulations with a low level of isopropyl alcohol with various antimicrobial additives show that high alkalinity is not critical to achieve microbial kill efficacy on microbial species within a contact time of 30 seconds. Table 7 shows the microbial kill data used in FIG. 12.

TABLE 7

| | *Staphylococcus aureus* ATCC 6538 Log Reduction | *Escherichia coli* O157:H7 ATCC 43895 Log Reduction |
|---|---|---|
| Formula 21 | 5.07 | 4.88 |
| Formula 23 | 4.58 | 3.4 |
| Formula 24 | 3.90 | 4.29 |

TABLE 7-continued

| | *Staphylococcus aureus* ATCC 6538 Log Reduction | *Escherichia coli* O157:H7 ATCC 43895 Log Reduction |
|---|---|---|
| Formula 25 | >4.48 | 5.79 |
| Formula 26 | 5.54 | 6.19 |

Figure 13:
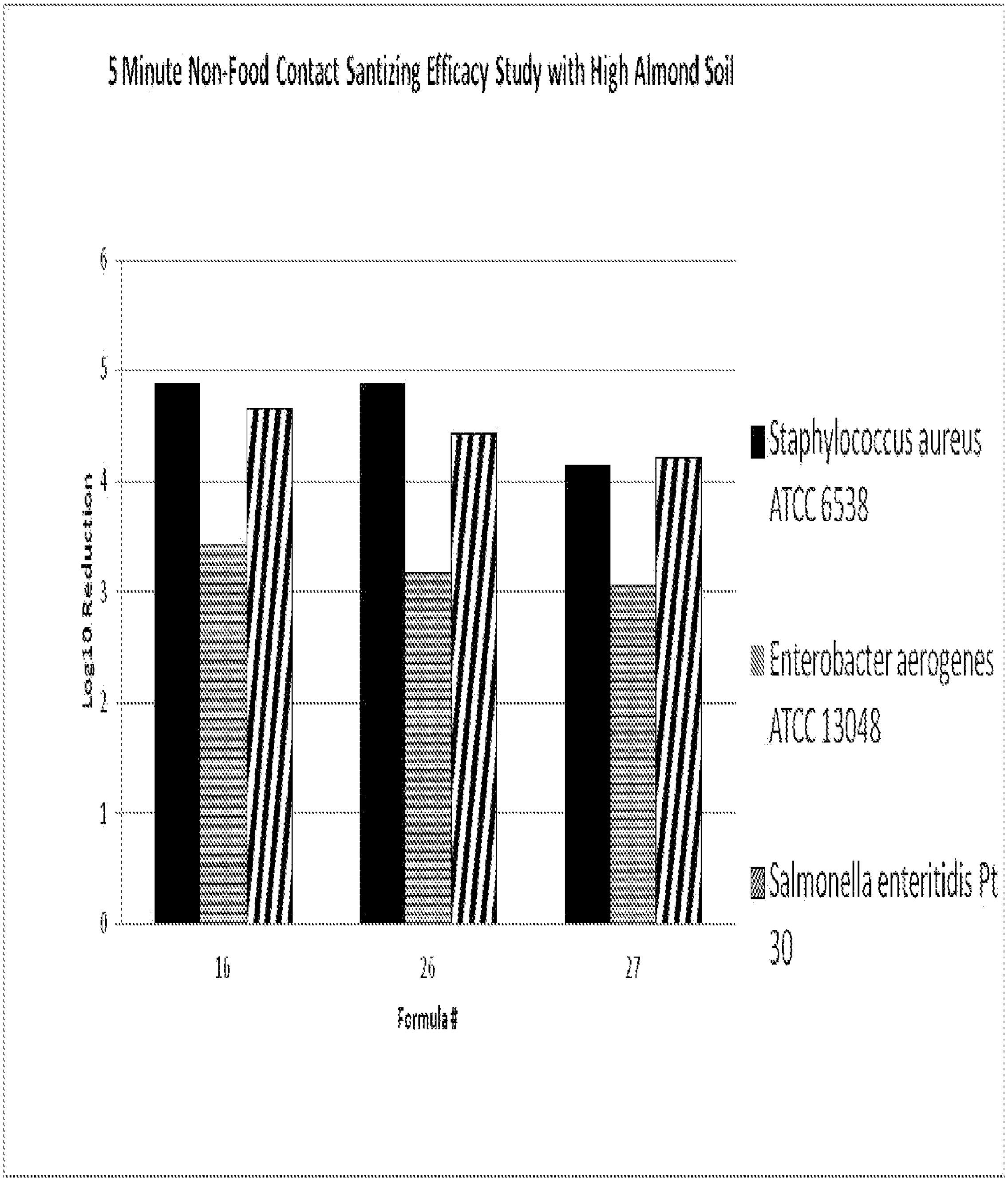
FIG. 13 is a graph depicting the results of a 5 minute non-food contact sanitizing test measuring the microbial kill efficacy of ready to use solutions containing isopropyl alcohol against bacterial strains of *S. aureus, E. aerogenes* and *S. enteritidis* in the presence of food soil.

FIG. 13 and Table 8: 5 Minute Non-Food Contact Sanitizing Efficacy Determination FIG. 13 illustrates the results for microbial kill efficacy *Staphylococcus aureus* ATCC 6538, *Enterobacter aerogenes* ATCC 13048 and *Salmonella enteritidis* Pt 30 by comparing test samples of ready to use cleaning, sanitizing and disinfecting compositions containing isopropyl alcohol found in FIGS. 3-5 above in the presence of ground almond food soil. Results of the test show that the lower alcohol formulations with antimicrobial additives have similar microbiological kill efficacy against the tested bacterial strains. Formula 27 (FIG. 5) represents the removal of the hydrogen peroxide component from the low alcohol Formula 26 (FIG. 4) and did show a decrease in microbiological kill efficacy with hydrogen peroxide removal for all the tested bacterial strains but also demonstrates that the hydrogen peroxide is just one of the components with antimicrobial effectiveness in the low alcohol formulations when tested in the presence of an oily food soil. Table 8 shows the microbial kill data used in FIG. 13.

TABLE 8

| | *Staphylococcus aureus* ATCC 6538 Log Reduction | *Enterobacter aerogenes* ATCC 13048 Log Reduction | *Salmonella enteritidis* Pt 30 Log Reduction |
|---|---|---|---|
| Formula 16 | >4.88 | >3.44 | >4.66 |
| Formula 26 | >4.88 | >3.18 | >4.45 |
| Formula 27 | 4.14 | >3.06 | >4.23 |

Figure 14:
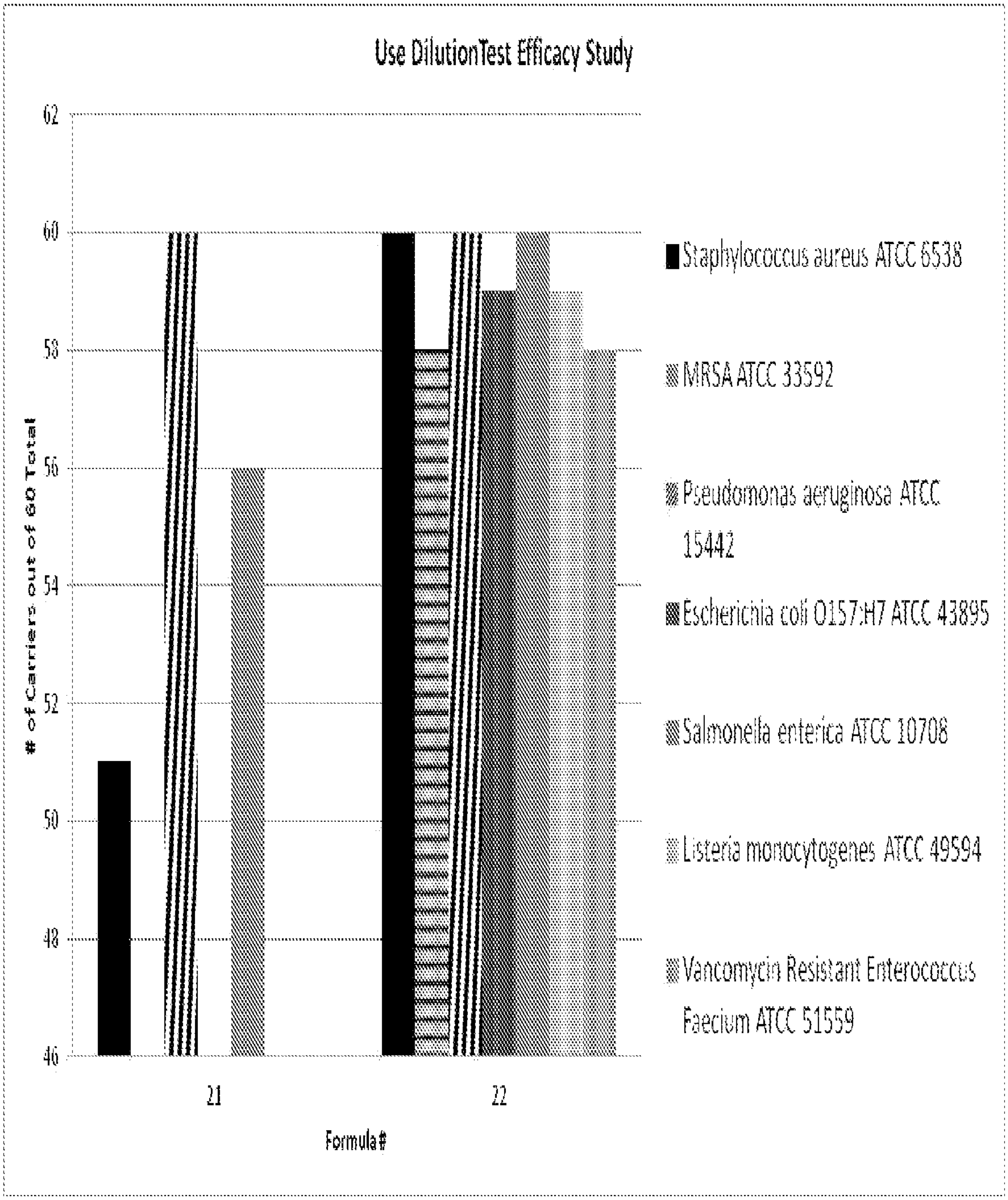
FIG. 14 is a graph depicting the results of a use dilution disinfectant testing the efficacy of the optimized acidic and neutral low alcohol formulations against bacterial strains of *S. aureus*, MRSA, *P. aeruginosa, E. coli* O157:H7, *S. enteric, L. monocytogenes* and Vancomycin-resistant enterococci (VRE) in solution.

FIG. 14 and Table 9: Use Dilution Sanitizing Efficacy Determination

FIG. 14 illustrates the results for microbial kill efficacy against *Staphylococcus aureus* ATCC 6538, MRSA ATCC 33592, *Pseudomonas aeruginosa* ATCC 15442, *Escherichia coli* O157:H7 ATCC 43895, *Salmonella* enteric ATCC 10708, *Listeria monocytogenes* ATCC 49594, and Vancomycin Resistant Enterococcus Faecium ATCC 51559 by comparing test samples of ready to use cleaning, sanitizing and disinfecting compositions containing isopropyl alcohol, found in FIG. 4, by using a use dilution disinfectant method. Results of the test show that formulations with a low level of isopropyl alcohol and a neutral pH show microbial kill efficacy and perform better than the acidic formulations as a disinfectant against a broad range of bacterial strains. Table 9 shows the microbial kill data used in FIG. 14.

TABLE 9

| | *Staphylococcus aureus* ATCC 6538 # Carriers | MRSA ATCC 33592 # Carriers | *Pseudomonas aeruginosa* ATCC 15442 # Carriers | *Escherichia coli* O157:H7 ATCC 43895 # Carriers | *Salmonella enteric* ATCC 10708 # Carriers | *Listeria monocytogenes* ATCC 49594 # Carriers | Vancomycin Resistant *Enterococcus Faecium* ATCC 51559 # Carriers |
|---|---|---|---|---|---|---|---|
| Formula 21 | 51/60 | * | 60/60 | * | 56/60 | * | * |
| Formula 22 | 60/60 | 58/60 | 60/60 | 59/60 | 60/60 | 59/60 | 58/60 |

* Not Tested

Figure 15:
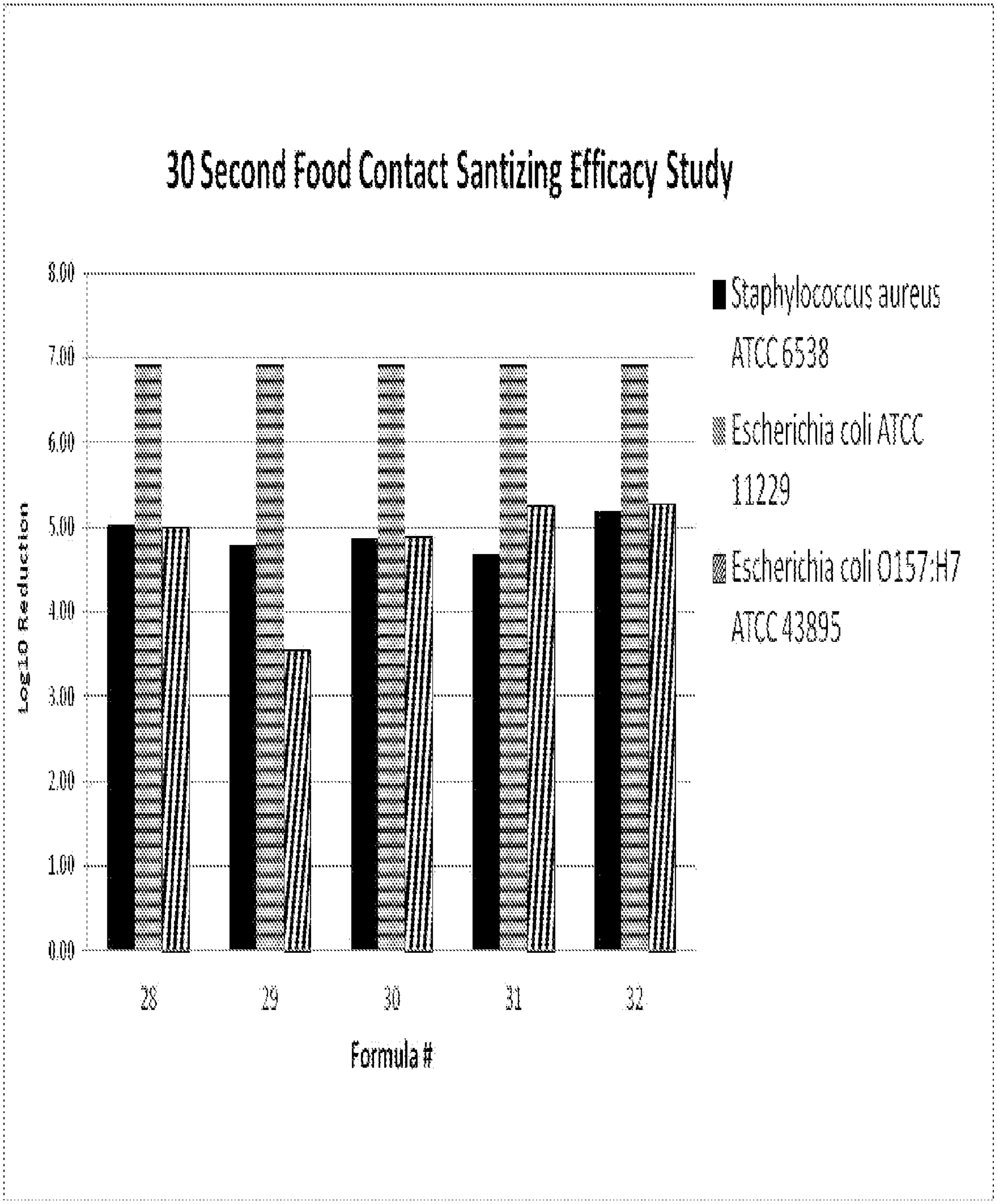
FIG. 15 is a graph depicting the results of a 30 second food contact sanitizing test measuring the microbial kill efficacy of ready to use solutions containing low levels of isopropyl alcohol against bacterial strains of *S. aureus, E. coli* and *E. coli* O157:H7 in solution.

FIG. 15 and Table 10: 30 Second Food Contact Sanitizing Efficacy Determination FIG. 15 illustrates the results for microbial kill against *Staphylococcus aureus* ATCC 6538, *Escherichia coli* ATCC 11229 and *Escherichia coli* O157:H7 ATCC 43895 by comparing test samples of ready to use cleaning, sanitizing and disinfecting compositions containing isopropyl alcohol, found in FIG. 5, in the presence of different surfactant systems by using a use dilution disinfectant method. Results of the test show that similar microbial efficacy is achieved against the bacterial strains tested with various surfactant systems. Table 10 shows the microbial kill data used in FIG. 15.

TABLE 10

| | *Staphylococcus aureus* ATCC 6538 Log Reduction | *Escherichia coli* ATCC 11229 Log Reduction | *Escherichia coli* O157:H7 ATCC 43895 Log Reduction |
|---|---|---|---|
| Formula 28 | 5.02 | >6.93 | 5.00 |
| Formula 29 | 4.79 | >6.93 | 3.55 |
| Formula 30 | 4.88 | >6.93 | 4.89 |
| Formula 31 | 4.67 | >6.93 | 5.26 |
| Formula 32 | 5.20 | >6.93 | 5.29 |

Obviously, many modifications and variations of the invention as hereinbefore set forth can be made without departing from the spirit and scope thereof, and, therefore, only such limitations should be imposed as are indicated by the appended claims.

The following is claimed:

1. A ready to use cleaning, sanitizing and disinfecting composition comprising:

(a) about 1 to about 12.1 wt % alcohol;

(b) 250 ppm to 3000 ppm of at least one surfactant;

(c) 0 ppm to 300 ppm quaternary ammonium alkyl or aryl salt or a combination thereof; and (d) hydrogen peroxide;

wherein the composition is an aqueous no-rinse use-solution and exhibits a closed cup flashpoint of greater than 100° F., and wherein the composition exhibits at least a 1 log reduction in *Enterobacter aerogenes* in a 5 minute non-food contact sanitizing test.

2. The composition of claim 1, further comprising a sequestering or scale removing agent.

3. The composition of claim 1, further comprising a non-aqueous co-solvent.

4. The composition of claim 1, further comprising a pH buffering system.

5. The composition of claim 1, wherein the surfactant comprises an alkali metal salt, alkanolamine salt of a C6-C24 saturated or unsaturated carboxylic acid, an alkylarylsulfonic acid or an alkyl sulfuric acid, sodium capryl sulfonate, sodium lauryl sulfate, linear alkyl benzene sulfonates, sodium dodecyl benzene sulfonate, decanoic acid, octanoic acid, n-pelargonic acid, or a mixture thereof.

6. The composition of claim 1, wherein the surfactant comprises an alkyl polyglucoside in which the alkyl group contains 8-18 carbon atoms, a glycerol fatty acid ester, a polyoxyethylene glycerol fatty acid ester, a polyoxyethylene sorbitan fatty acid ester, a polyethyleneglycol fatty acid ester, or polyoxyethylene-polyoxypropylene block copolymer with terminal hydroxyl groups, or a combination thereof.

7. The composition of claim 1, wherein the surfactant has a cationic amino group and an anionic carboxylate or sulfonate group.

8. The composition of claim 1, wherein the quaternary ammonium alkyl or aryl salt comprises a C6-C24 alkyl dimethyl benzyl ammonium chloride, octyl decyl dimethyl ammonium chloride, dioctyl dimethyl ammonium chloride, didecyl dimethyl ammonium chloride, or a mixture thereof.

9. The composition of claim 1, wherein the hydrogen peroxide is between about 0.001 wt % to about 1 wt % of the composition.

10. The composition of claim 2, the sequestering or scale removing agent comprising gluconic acid, acetic acid, citric acid, lactic acid, EDTA, NTA, HEDTA, acrylic acid polymers, methacrylic acid polymers, acrylic acid-methacrylic acid copolymers, water-soluble sodium, potassium or ammonium salts thereof, sodium, potassium, or ammonium phosphates thereof, or mixtures thereof.

11. The composition of claim 3, wherein the non-aqueous co-solvent comprises polypropylene glycol with a degree of polymerization from 10 to 200, benzyl alcohol, methyl benzyl alcohol, alpha phenyl ethanol, ethylene glycol monobutyl ether, diethylene glycol monobutyl ether, ethylene glycol phenyl ether, propylene glycol phenyl ether, and combinations thereof.

12. The composition of claim 3, wherein the non-aqueous co-solvent is less than 1 wt % of the composition.

13. The composition of claim 1, further comprising a peroxide stabilizing agent.

14. The composition of claim 13, wherein the peroxide stabilizing agent is selected from the group of hydroxyethylidene 1,1-diphosphonic acid, 2-aminoethylphosphonic acid, dimethyl methylphosphonate, amino tris(methylene phosphonic acid), ethylenediamine tetra(methylene phosphonic acid), tetramethylenediamine tetra(methylene phosphonic acid), hexamethylenediamine tetra(methylene phosphonic acid), diethylenetriamine penta(methylene phosphonic acid), phosphonobutane-tricarboxylic acid, N-(phosphonomethyl)iminodiacetic acid, 2-carboxyethyl phosphonic acid, 2-hydroxyphosphonocarboxylic acid, amino-tris-(methylene-phosphonic acid), or a mixture thereof.

15. The composition of claim 4, wherein the pH buffering system includes a pH adjusting agent comprises an organic acid, mineral acid, alkaline metal, alkaline earth salt, phosphoric acid, metal carbonate, or a mixture thereof.

16. The composition of claim 2, wherein the sequestering or scale removing agent comprises citric acid or EDTA.

17. The composition of claim 13, wherein the peroxide stabilizing agent comprises dipicolinic acid.

18. The composition of claim 1, wherein the surfactant comprises an alkyl alcohol alkoxylate.

19. The composition of claim 1, wherein the pH is an alkaline pH.

20. The composition of claim 1, wherein the pH is a neutral pH.

21. The composition of claim 1, wherein the composition exhibits at least a 4 log reduction in *Staphylococcus aureus* or *Escherichia coli* in a 30 second food contact sanitizing test.

22. The composition of claim 1, wherein the composition exhibits at least a 3 log reduction in *Escherichia coli* in a 5 minute non-food contact sanitizing test.

23. The composition of claim 1, wherein the composition exhibits at least a 5 log reduction in *Staphylococcus aureus* or *Escherichia coli* in a 30 second food contact sanitizing test.

24. The composition of claim 1, wherein the composition exhibits at least a 4 log reduction in *Staphylococcus aureus, Escherichia coli, Pseudomonas aeruginosa, Escherichia coli* O157:H7, *Listeria monocytogenes, Salmonella typhimurium, Enterobacter sakazakii*, and *Vibrio cholerae.*

25. A method of cleaning a surface comprising: applying a composition to a surface, the composition comprising:

(a) about 1 to about 12.1 wt % alcohol;

(b) 250 ppm to 3000 ppm of at least one surfactant;

(c) 0 ppm to 300 ppm quaternary ammonium alkyl or aryl salt or a combination thereof; and (d) hydrogen peroxide;

wherein the composition is an aqueous no-rinse use-solution and exhibits a closed cup flashpoint of greater than 100° F., and wherein the composition exhibits at least a 1 log reduction in *Enterobacter aerogenes* in a 5 minute non-food contact sanitizing test.

26. The method of claim 25, wherein the surface is a food contact surface.

27. The method of claim 26, wherein the food contact surface is located in a kitchen, or a food processing plant.

28. The method of claim 25, wherein the composition is applied to the surface by wiping or spraying.

29. The method of claim 25, further comprising allowing the composition to remain on the surface for a period of time.

30. The method of claim 25, further comprising removing the composition from the surface by wiping or rinsing.

31. The method of claim 25, the composition further comprising a sequestering or scale removing agent.

32. The method of claim 25, the composition further comprising a non-aqueous co-solvent.

33. The method of claim 25, the composition further comprising a pH buffering system.

34. The method of claim 25, wherein the surfactant comprises an alkali metal salt, alkanolamine salt of a C6-C24 saturated or unsaturated carboxylic acid, an alkylarylsulfonic acid or an alkyl sulfuric acid, sodium capryl sulfonate, sodium lauryl sulfate, linear alkyl benzene sulfonates, sodium dodecyl benzene sulfonate, decanoic acid, octanoic acid, n-pelargonic acid, or a mixture thereof.

35. The method of claim 25, wherein the surfactant comprises an alkyl polyglucoside in which the alkyl group contains 8-18 carbon atoms, a glycerol fatty acid ester, a polyoxyethylene glycerol fatty acid ester, a polyoxyethylene sorbitan fatty acid ester, a polyethyleneglycol fatty acid ester, or polyoxyethylene-polyoxypropylene block copolymer with terminal hydroxyl groups, or a combination thereof.

36. The method of claim 25, wherein the surfactant has a cationic amino group and an anionic carboxylate or sulfonate group.

37. The method of claim 25, wherein the quaternary ammonium alkyl or aryl salt comprises a C6-C24 alkyl dimethyl benzyl ammonium chloride, octyl decyl dimethyl ammonium chloride, dioctyl dimethyl ammonium chloride, didecyl dimethyl ammonium chloride, or a mixture thereof.

38. The method of claim 25, wherein the hydrogen peroxide is between about 0.001 wt % to about 1 wt % of the composition.

39. The method of claim 31, the sequestering or scale removing agent comprising gluconic acid, acetic acid, citric acid, lactic acid, EDTA, NTA, HEDTA, acrylic acid polymers, methacrylic acid polymers, acrylic acid-methacrylic acid copolymers, water-soluble sodium, potassium or ammonium salts thereof, sodium, potassium, or ammonium phosphates thereof, or mixtures thereof.

40. The method of claim 32, wherein the non-aqueous co-solvent comprises polypropylene glycol with a degree of polymerization from 10 to 200, benzyl alcohol, methyl benzyl alcohol, alpha phenyl ethanol, ethylene glycol monobutyl ether, diethylene glycol monobutyl ether, ethylene glycol phenyl ether, propylene glycol phenyl ether, and combinations thereof.

41. The method of claim 32, wherein the non-aqueous co-solvent is less than 1 wt % of the composition.

42. The method of claim 25, the composition further comprising a peroxide stabilizing agent.

43. The method of claim 42, wherein the peroxide stabilizing agent is selected from the group of hydroxyethylidene 1,1-diphosphonic acid, 2-aminoethylphosphonic acid, dimethyl methylphosphonate, amino tris(methylene phosphonic acid), ethylenediamine tetra(methylene phosphonic acid), tetramethylenediamine tetra(methylene phosphonic acid), hexamethylenediamine tetra(methylene phosphonic acid), diethylenetriamine penta(methylene phosphonic acid), phosphonobutane-tricarboxylic acid, N-(phosphonomethyl) iminodiacetic acid, 2-carboxyethyl phosphonic acid, 2-hydroxyphosphonocarboxylic acid, amino-tris-(methylene-phosphonic acid), or a mixture thereof.

44. The method of claim 33, wherein the pH buffering system includes a pH adjusting agent comprises an organic acid, mineral acid, alkaline metal, alkaline earth salt, phosphoric acid, metal carbonate, or a mixture thereof.

45. The method of claim 31, wherein the sequestering or scale removing agent comprises citric acid or EDTA.

46. The method of claim 42, wherein the peroxide stabilizing agent comprises dipicolinic acid.

47. The method of claim 25, wherein the surfactant comprises an alkyl alcohol alkoxylate.

48. The method of claim 25, wherein the pH of the composition is an alkaline pH.

49. The method of claim 25, wherein the pH of the composition is a neutral pH.

50. The method of claim 25, wherein the composition exhibits at least a 4 log reduction in *Staphylococcus aureus* or *Escherichia coli* in a 30 second food contact sanitizing test.

51. The method of claim 25, wherein the composition exhibits at least a 3 log reduction in *Escherichia coli* in a 5 minute non-food contact sanitizing test.

52. The method of claim 25, wherein the composition exhibits at least a 5 log reduction in *Staphylococcus aureus* or *Escherichia coli* in a 30 second food contact sanitizing test.

53. The method of claim 25, wherein the composition exhibits at least a 1 log reduction in *Enterobacter aerogenes* in a 5 minute non-food contact sanitizing test.

54. The method of claim 25, wherein the composition exhibits at least a 4 log reduction in *Staphylococcus aureus, Escherichia coli, Pseudomonas aeruginosa, Escherichia coli* O157:H7, *Listeria monocytogenes, Salmonella typhimurium, Enterobacter sakazakii*, and *Vibrio cholerae.*

55. The composition of claim 1, wherein the composition comprises 0 ppm to 100 ppm of the quaternary ammonium alkyl or aryl salt or a combination thereof.

56. The method of claim 25, wherein the composition comprises 0 ppm to 100 ppm of the quaternary ammonium alkyl or aryl salt or a combination thereof.

* * * * *